United States Patent
Wilson

(10) Patent No.: US 12,168,217 B2
(45) Date of Patent: Dec. 17, 2024

(54) POLYORGANIC FUNCTIONAL GROUPS MODIFIED SILICA, PROCESSES TO MAKE AND USE THEREOF

(71) Applicant: SI-NOVATION LTD, Hubei (CN)

(72) Inventor: John Robert Wilson, Essex (GB)

(73) Assignee: SI-NOVATION LTD, Hubei (CN)

(*) Notice: Subject to any disclaimer, the term of this patent is extended or adjusted under 35 U.S.C. 154(b) by 1257 days.

(21) Appl. No.: 15/755,562

(22) PCT Filed: Aug. 1, 2016

(86) PCT No.: PCT/CN2016/092663
§ 371 (c)(1),
(2) Date: Feb. 27, 2018

(87) PCT Pub. No.: WO2017/036268
PCT Pub. Date: Mar. 9, 2017

(65) Prior Publication Data
US 2019/0176124 A1 Jun. 13, 2019

(30) Foreign Application Priority Data
Aug. 29, 2015 (GB) .................................. 1515414

(51) Int. Cl.
| | | |
|---|---|---|
| B01J 20/26 | (2006.01) | |
| B01D 53/02 | (2006.01) | |
| B01J 20/32 | (2006.01) | |
| B01J 31/06 | (2006.01) | |
| B01J 37/02 | (2006.01) | |
| B01J 47/00 | (2017.01) | |
| C02F 1/28 | (2023.01) | |
| C02F 1/42 | (2023.01) | |
| C02F 1/72 | (2023.01) | |
| C02F 101/20 | (2006.01) | |
| C02F 101/30 | (2006.01) | |
| C07F 7/18 | (2006.01) | |
| C08G 77/28 | (2006.01) | |
| C08K 3/36 | (2006.01) | |
| C08K 9/06 | (2006.01) | |

(52) U.S. Cl.
CPC ............ *B01J 20/265* (2013.01); *B01D 53/02* (2013.01); *B01J 20/3204* (2013.01); *B01J 20/3219* (2013.01); *B01J 20/3231* (2013.01); *B01J 31/069* (2013.01); *B01J 37/0219* (2013.01); *B01J 47/00* (2013.01); *C02F 1/285* (2013.01); *C02F 1/42* (2013.01); *C02F 1/725* (2013.01); *C07F 7/1804* (2013.01); *C08G 77/28* (2013.01); *B01D 2253/202* (2013.01); *B01D 2253/25* (2013.01); *B01J 2231/005* (2013.01); *B01J 2531/004* (2013.01); *C02F 2101/20* (2013.01); *C02F 2101/30* (2013.01); *C08K 3/36* (2013.01); *C08K 9/06* (2013.01)

(58) Field of Classification Search
None
See application file for complete search history.

(56) References Cited

U.S. PATENT DOCUMENTS

| | | |
|---|---|---|
| 5,609,856 A | 3/1997 | Dubief et al. |
| 2010/0297049 A1 | 11/2010 | Samain et al. |

FOREIGN PATENT DOCUMENTS

| | | | |
|---|---|---|---|
| GB | 2076842 | 12/1981 | |
| WO | 2006013060 | 2/2006 | |
| WO | WO-2006013060 A1 * | 2/2006 | ............ C08G 77/28 |
| WO | 2007090676 | 8/2007 | |
| WO | 2009109457 | 9/2009 | |

OTHER PUBLICATIONS

Lu, Xueran et al., "Polysiloxane-Bound Hydrosilylation Coordinate Catalyst with Mixed Bidentate Ligands", Journal of Molecular Catalysis (China), Feb. 1993, pp. 1-8.

* cited by examiner

*Primary Examiner* — Michael Forrest
(74) *Attorney, Agent, or Firm* — JCIPRNET

(57) ABSTRACT

The invention relates to new compositions of polyorganic functional groups modified silica. The compositions contain a wide range of different functional groups such as mercapto, sulfide, thiourea, amines and amides in the same composition and each of these functional groups are present in an array of numerous different oligomers, configurations and stereochemistry. These functional groups have a strong affinity for metals and particular targets. Combining a high number of these functional groups together in the same composition enhances the overall binding affinity of the functionalised material. Combination with different structural configurations further enhances the capacity to bind to diverse structural variations in the targets found in actual process, product and waste streams. This multitude of binding mechanisms enables very high levels of purification and target removal as well as selectivity to be achieved in product, process and waste streams. The compounds are useful for the purification of products and for the removal of unwanted organic and inorganic compounds from product, process and waste streams, as chromatography medium for the purification and separation of metals, metal complexes and organic and biological compounds, for solid phase extraction, for solid phase synthesis, for metal mediated heterogeneous catalysis, for metal ion abstraction and for the immobilisation of bio-molecules.

6 Claims, No Drawings

POLYORGANIC FUNCTIONAL GROUPS MODIFIED SILICA, PROCESSES TO MAKE AND USE THEREOF

CROSS-REFERENCE TO RELATED APPLICATION

This application is a 371 of international application of PCT application serial no. PCT/CN2016/092663, filed on Aug. 1, 2016, which claims the priority benefit of United Kingdom application no. 1515414.9, filed on Aug. 29, 2015. The entirety of each of the above-mentioned patent applications is hereby incorporated by reference herein and made a part of this specification.

The invention relates to new polyorganic functional groups modified silica, processes to make and their use, for example for removing organic and inorganic compounds from product, process and waste streams, cation and anion exchangers, metal chromatography materials, solid phase purification or extraction materials, immobilisation materials for bio-molecules, anti-microbial agents, catalysts and catalyst supports, hydrophilicity modifiers, flame proofing agents, antistatic agents, coatings for biomedical devices, controlled release materials, water repellent films and coatings, solid phase synthesis materials and chromatography materials. The invention also relates to precursors of these new products and processes for their production.

Technology development across many different industries and market applications is driving the need to achieve even higher levels of purity of the chemical components that are the foundation of these technologies. Examples include the pharmaceutical and biotechnology industries where organic and inorganic impurities have to be removed to ever lower levels and the electronic industry where common residual metals such as sodium, magnesium and iron have to be at less than 1 ppm in the product.

Societal and legislative pressure on the need to protect the environment is growing leading to ever increasing demand for cleaner processes, the avoidance and reduction of waste and in particular lower residual levels of toxic metals and compounds in the environment.

Precious metals including platinum, rhodium, palladium, ruthenium, iridium and gold are a limited resource which are used extensively in numerous different applications across a vast array of industries. In addition more and more applications are being found and developed where precious metals are required. The high cost of these metals along with their limited availability and toxicity necessitates the need for very efficient technology that can recover these metals from product, process and waste streams thus allowing their reuse. Examples of where these metals can be recovered from product, process and waste streams within the petrochemical industry include those from hydroformylation and hydrosilylation reactions.

The growing use of rare earth metals such as scandium, yttrium, lanthanum, cerium, praseodymium, neodymium, promethium, samarium, europium, gadolinium, terbium, dysprosium, holmium, erbium, thulium, ytterbium and lutetium in numerous applications across different industries also highlights the growing need for new and better technologies to recover more effectively these metals from product, process and waste streams and allow their reuse.

In a recent report (Critical metals in strategic energy technologies, ISBN 978-92-79-20698-6) it was highlighted that due to the growing use of certain metals, made more acute by issues associated with the geographical location of the source of these metals, a shortage of these metals could be a potential limitation of the deployment of low-carbon energy technologies. These industries include nuclear, solar, wind, bio-energy, carbon capture and storage and electricity grids. Fourteen metals, labelled the critical metals, were identified as at potential risk with five at high risk namely neodymium, dysprosium, indium, tellurium and gallium. The report proposes a number of solutions including better metal recovery technologies thus enabling reuse.

In refining and purification process streams in the mining industry, high value metals, for example precious metals, are often present at low ppm concentrations and in the presence of other metals with the latter sometimes being in significantly higher concentrations. To reduce significant losses of these high value metals there is a need for improved technology that can a) remove the desired metals to very low residual concentrations; b) be very effective at low metal ppm concentrations; and c) selectively remove the high value metals in the presence of other metals which are at higher concentrations.

High value organic compounds or polymers are often produced through multi-step processes and can often contain side products, isomers and impurities. In most cases the desired product has to be purified and there is a growing need for more effective purification technology designed to remove a specific range of side products, isomers and impurities all present with the desired product. Existing technologies such as crystallisation can lead to significant loss of product.

Functionalised materials are one of several approaches that are being developed to purify products, selectively remove desired components from a mixture or remove toxic and/or high value metals or compounds from product, process and waste streams. Using the functionalised materials approach involves passing the stream through the functionalised material and the desired components are selectively removed. An example of such a material is carbon. Depending on process conditions carbon contains a number of oxygenated organic groups on its surface. Whilst carbon is cheap, disadvantages include high product loss and poor performance in achieving low residual levels of the undesired compound or metal in the final product. This is a consequence of the non-specific binding nature and poor efficacy of the alcohol, phenol, aldehyde and carboxylic acid functional groups on the surface.

Functionalised organic polymers are an example of a functionalised material that can be used for product purification. Examples of organic polymer frameworks include polystyrene and polyolefin. Only a very narrow and simple range of mono functional groups are attached to these frameworks. Examples of functional groups include sulfonic acid or amine groups which performs primarily through an ion exchange mechanism. These functional groups possess only a low affinity for the metals of interest discussed above. Thus invariably the high levels of performance required cannot be achieved utilising existing materials with organic frameworks. One of several key limitations of these organic resins is the inability to attach the desired functional group for the application to the organic polymer framework. This is due to the limited chemistry that can be conducted on these polymers. Thus the prospect of being able to attach a number of different and multi-functional groups to these organic polymer backbones to achieve the desired level of performance is very low. Further limitations include poor chemical and thermal stability and swelling and shrinking in organic solvents. Overall there are severe limitations in developing the required technology based on these organic frameworks.

Inorganic polymer systems such as silica, alumina and titanium oxide have also been disclosed as functionalised materials. The inorganic polymer framework possesses several advantages over organic polymer frameworks namely better physical, chemical and thermal stability, better access to functional groups on the surface due to a well defined pore structure and easier operation due to no swelling.

Examples of simple functionalised inorganic materials include alkyl amines and alkyl mercaptans from Silicycle, Johnson Matthey, Evonik and PhosphonicS (WO2006/013060, WO2007/090676). However only a small range of simple functional groups can be attached by a very limited number of chemical processes to these frameworks. A further limitation of these inorganic polymer materials is the lower functional group loading compared to organic polymers.

Existing functionalised inorganic materials are limited by having a narrow range of single simple functional groups, with usually one and at most two hetero atoms present which can provide only a single binding mechanism, low affinity for the target to be removed along with low functional group loading and thus low effective loading of the target on use. This is a consequence of a) the starting reagents, silanes, to manufacture these materials are not readily available as they are difficult to produce; b) the limited availability in the chemical range of such reagents to use or to modify; c) the limited range of chemistry to make silanes; d) cost, silanes are expensive to manufacture due to the chemistry involved and e) the difficulty associated with adapting simple functional groups on a surface into more complex functional groups in order to improve performance.

Whilst functionalised inorganic materials represent a step forward over functionalised organic resins further significant improvements are required in order to meet existing and new technical challenges such as lower residual impurity content, greater selectivity and higher loading.

The existing technology is not sufficient to enable the design or manufacture of the desired functionalised materials with the required complex multi functionality on a realistic commercial basis.

New technology is required to achieve the required performance levels across many market applications in order to meet existing and new commercial, technical, environmental and societal challenges.

For example, the residual metal in a pharmaceutical compound or a metal catalyst in a waste process stream will be present in a range of different species that will be different to the starting form of the metal. These include different oxidation states, single molecules to nano particles, multi metal species with different complexes or ligands bound tightly to each of these metal species. Furthermore it is to be expected that there will be variations in the actual composition of all these different species following each manufacturing run of the pharmaceutical compound or process. Thus to achieve the desired product purity or metal capture the functionalised material must contain a range of different and complex functional groups each with a very high affinity for the target to provide a wide variety of binding mechanisms with the target in its many forms. In addition these functional groups need to be arranged in close proximity on the surface and within the pores as well as being optimally aligned so as to ensure that they can displace the ligands already bound to the target in the liquid phase thus to capture and retain the target. Each metal species is likely to require a different binding mechanism. To be effective this combination of design requirements must be present in the same functionalised material. Furthermore the design of the functionalised material must include high thermal, physical and chemical stability, high functional group loading, broad solvent compatibility and improved wetting properties, no swelling and ready access to the functional groups. In addition these materials must be cost effective thus have to be manufactured via simple chemical processes based on readily available starting materials. This design requirement necessitates that a diverse range of different and complex functional groups which are subsequently covalently attached to the silica surface are produced in the same chemical reaction and preferably in a one pot process.

The inventors have discovered a class of multi-functional compounds which possesses these desirable combinations of characteristics as well as being capable of being manufactured through flexible and simple chemical processes making them suitable for use in a range of applications including acting as scavengers for inorganic and organic compounds, metal chromatography materials, solid phase purification or extraction materials, removal and purification of biological compounds, ion exchange materials, catalysts, catalyst immobilisation supports, immobilisation materials for biomolecules including enzymes, controlled release materials, anti-microbial agents, hydrophilicity modifiers, flame proofing agents, antistatic agents, solid phase synthesis materials and chromatography materials, or which are precursors for these. In a first aspect of the present invention, there is provided compositions of General Formula I:

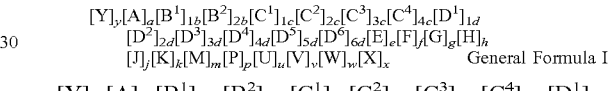

General Formula I

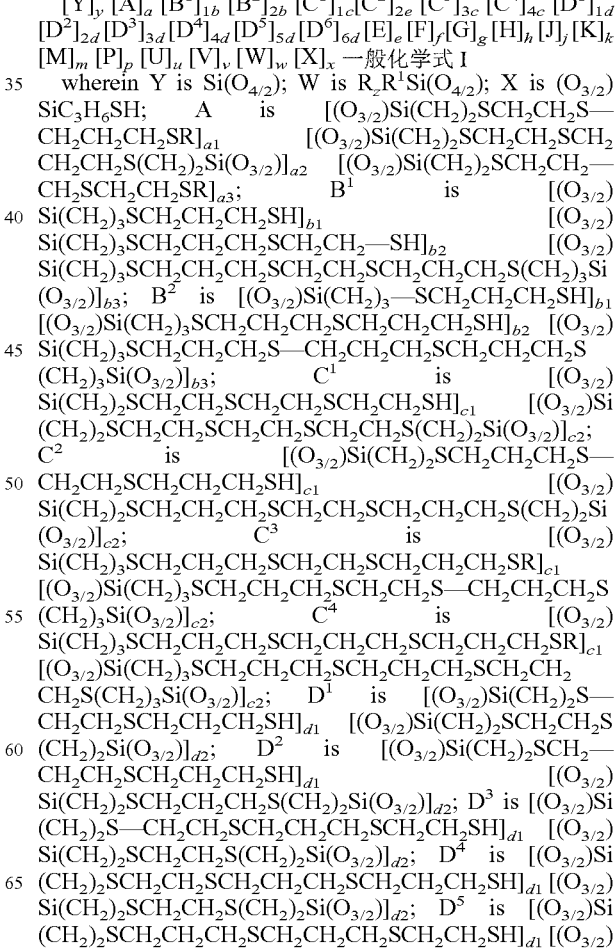

Si(CH$_2$)$_2$SCH$_2$CH$_2$CH$_2$S(CH$_2$)$_2$—Si(O$_{3/2}$)]$_{d2}$; D$^6$ is [(O$_{3/2}$)Si(CH$_2$)$_2$SCH$_2$CH$_2$CH$_2$SCH$_2$CH$_2$CH$_2$SCH$_2$CH$_2$CH$_2$SH]$_{d1}$ [(O$_{3/2}$)Si(CH$_2$)$_2$S—CH$_2$CH$_2$CH$_2$S(CH$_2$)$_2$Si(O$_{3/2}$)]$_{d2}$; E is [(O$_{3/2}$)Si(CH$_2$)$_3$SCH$_2$CH$_2$CH$_2$NR$^3$R$^4$]; F is [(O$_{3/2}$)Si(CH$_2$)$_n$SCH$_2$—CH$_2$CH$_2$SR]$_{f1}$[(O$_{3/2}$)Si(CH$_2$)$_n$SCH$_2$CH$_2$CH$_2$S(CH$_2$)$_n$Si(O$_{3/2}$)]$_{f2}$; G is [(O$_{3/2}$)Si(CH$_2$)$_n$SCH$_2$CH$_2$SR]$_{g1}$ [(O$_{3/2}$)Si(CH$_2$)$_n$SCH$_2$CH$_2$S(CH$_2$)$_n$Si(O$_{3/2}$)]$_{g2}$; H is [(O$_{3/2}$)Si(CH$_2$)$_n$SCH$_2$CH$_2$S(CH$_2$)$_3$NZR]; J is [(O$_{3/2}$)Si(CH$_2$)$_n$SCH$_2$CH$_2$CH$_2$S(CH$_2$)$_3$NZR]; K is [(O$_{3/2}$)Si(CH$_2$)$_n$SCH$_2$CH$_2$S((CH$_2$)$_3$NZ(CH$_2$)$_3$SCH$_2$CH$_2$S)$_x$R]$_{k1}$ [(O$_{3/2}$)Si(CH$_2$)$_n$SCH$_2$CH$_2$S((CH$_2$)$_3$NZ(CH$_2$)$_3$SCH$_2$CH$_2$S)$_v$(CH$_2$)$_n$Si(O$_{3/2}$)]$_{k2}$ [(O$_{3/2}$)Si(CH$_2$)$_n$SCH$_2$CH$_2$S—((CH$_2$)$_3$NZ(CH$_2$)$_3$SCH$_2$CH$_2$S)$_i$(CH$_2$)$_3$NZR]$_{k3}$; M is [(O$_{3/2}$)Si(CH$_2$)$_n$SCH$_2$CH$_2$CH$_2$S((CH$_2$)$_3$NZ(CH$_2$)$_3$S—CH$_2$CH$_2$CH$_2$S)$_x$R]$_{m1}$[(O$_{3/2}$)Si(CH$_2$)$_n$SCH$_2$CH$_2$CH$_2$S((CH$_2$)$_3$NZ(CH$_2$)$_3$SCH$_2$CH$_2$CH$_2$S)$_v$(CH$_2$)$_n$Si(O$_{3/2}$)]$_{m2}$ [(O$_{3/2}$)Si(CH$_2$)$_n$SCH$_2$CH$_2$CH$_2$S((CH$_2$)$_3$NZ(CH$_2$)$_3$SCH$_2$CH$_2$CH$_2$S)$_i$(CH$_2$)$_3$NZR]$_{m3}$; P is [(O$_{3/2}$)Si(CH$_2$)$_n$S—CH$_2$CH$_2$CH$_2$S((CH$_2$)$_2$T(CH$_2$)$_2$SCH$_2$CH$_2$S)$_x$R]$_{p1}$ [(O$_{3/2}$)Si(CH$_2$)$_n$SCH$_2$CH$_2$CH$_2$S((CH$_2$)$_2$T(CH$_2$)$_2$S—CH$_2$CH$_2$CH$_2$S)$_v$(CH$_2$)$_n$Si(O$_{3/2}$)]$_{p2}$ [(O$_{3/2}$)Si(CH$_2$)$_n$SCH$_2$CH$_2$CH$_2$S((CH$_2$)$_2$T(CH$_2$)$_2$SCH$_2$CH$_2$CH$_2$S)$_i$(CH$_2$)$_2$-TR]$_{p3}$; U is Si(CH$_2$)$_3$S(CH$_2$)$_3$NHC(=S)NH$_2$; V is [O$_{3/2}$Si(CH$_2$)$_n$S[(CH$_2$)$_{n1}$S]$_{n2}$R$^9$ wherein Z is independently selected from a hydrogen, C$_{1-22}$-alkyl group, C$_{2-22}$-alkenyl group, C$_{1-22}$-aryl group, CO NHR$^5$, CS NHR$^5$ and CO OR$^5$; R$^5$ is independently selected from a hydrogen, C$_{1-22}$-alkyl group, C$_{2-22}$-alkenyl group, C$_{1-22}$-aryl group and C$_{1-22}$-heteroaryl group; T is an optionally substituted C$_{2-22}$-alkyl group, C$_{2-22}$-cycloalkyl group, C$_{2-22}$-aryl group, C$_{2-22}$-heteroaryl group and C$_{2-22}$-alkylaryl group; R is selected from a hydrogen, C$_{1-22}$-alkyl group, C$_{2-22}$-alkenyl group, C$_{1-22}$-aryl group, C$_{1-22}$-alkylaryl group and an acyl group CO R$^2$; R$^1$ is a group which is optionally substituted and selected from a C$_{1-22}$-alkyl group, C$_{2-22}$-alkenyl group, C$_{2-22}$-alkynyl group, aryl group, alkyl amine group, alkyl polyalkyl amine group and a mercaptoalkyl group; R$^2$ is independently selected from a hydrogen, C$_{1-22}$-alkyl group, C$_{2-22}$-alkenyl group and a C$_{1-22}$-aryl group; R$^3$ and R$^4$ are either independently selected from a hydrogen, C$_{1-22}$-alkyl group, C$_{1-22}$-aryl group, C$_{1-22}$-heteroaryl group, C$_{1-22}$-alkylaryl group, alkyl amine group, alkyl polyalkyl amine group, a trialkyl ammonium group or both part of a C$_{3-12}$-cyclic alkyl or hetero alkyl or aromatic group; R$^9$ is (CH$_2$)$_3$N$^+$(L$^1$)(CH$_3$)$_2$CH$_2$CH$_2$CH$_3$), (CH$_2$)$_3$N$^+$(L$^1$)(CH$_3$)$_2$CH$_2$CHCH$_2$ and a compound of General Formula III; n3 is an integer between 0 and 100; L$^1$ is an anion including but not limited to a halide, nitrate, sulfate, carbonate, phosphate, chromate, permanganate, borohydride, substituted borohydrides such as cyanoborohydride;

General Formula III

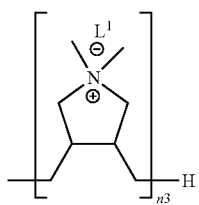

n and n1 are integers independently either 2 or 3; n2 is an integer between 0 and 100; i, x and v are independent integers from 1 to 100; q is an integer from 1 to 3, z is an integer from 0 to 2 such that q+z=3; a, a1–3, 1b, 1b1–3, 2b, 2b1–3, 1c, 1c1–2, 2c, 2c1–2, 3c, 3c1–2, 4c, 4c1–2, 1d, 1d1–2, 2d, 2d1–2, 3d, 3d1–2, 4d, 4d1–2, 5d, 5d1–2, 6d, 6d1–2, e, f, f1–2, g, g1–2, h, j, k, k1–3, m, m1–3, p, p1–3, u, x, v, w and y are integers such that the ratio of y:a+(1 and 2)b+(1 to 4)c+(1 to 6) d+e+f+g+h+j+k+m+u+v+w+x is from 0.01 to 10,000; y:a+(1 and 2)b+(1 to 4)c+(1 to 6) d+e+f+g+u+v+w+x is from 0.01 to 10,000; y:f+g+h+j+k+m+u+w+x is from 0.01 to 10,000; y:e+f+g+u+v+w+x is from 0.01 to 10,000; y:f+g+h+j+p+u+w+x is from 0.01 to 10,000; and respectively each of the following ratios a1:a3; a1:a2+a3; 1b2:1b1+1b3; 2b2:2b1+2b3; 1c1:1c2; 2c1:2c2; 3c1:3c2; 4c1:4c2; 1d1:1d2; 2d1:2d2; 3d1:3d2; 4d1:4d2; 5d1:5d2; 6d1:6d2; f1:f2; g1:g2; k1:k3; k1:k2+k3; m1:m3; m1:m2+m3; and p1:p3; p1:p2+p3 vary independently between 0.01 to 100; and in General Formula I component Y and at least one of the following components A, B$^{1-2}$, C$^{1-4}$, D$^{1-6}$, E, H, J, K, M, P, U and V are always present.

Advantages of these new compounds are that they contain a wide range of different polyorganic functional groups each with very high and selective affinity for the target and these functional groups are readily accessible and spatially arranged in numerous different configurations on the surface and within the pores to achieve the desired effect. In addition each of the variety of functional groups present provides a different binding mechanism to the target thus enabling very high removal levels of the target or targets. A further advantage is that a wide range of different functional groups can be incorporated into the same composition thus providing a multitude of different binding mechanisms that are necessary to remove the wide range of targets that may be present in different forms to very low residual levels. Furthermore this multi-binding mechanism design enables a selected range of targets to be removed from a product, process or waste stream. The increased number and range of binding functional groups also provides additional advantages including higher target loading as well as being able to manage batch to batch variations in the composition of the numerous species of targets to be removed.

Low functional group loading, a consequence of the number of silanol groups available on the silica surface, is one of the limitations of inorganic polymer frameworks. The design of polyorganic functional groups incorporated into and along chains attached to the surface has the advantage of increasing the functional group loading. To avoid blocking the pores with large polymers and subsequently reducing access to the functional groups a further advantage is to first attach the longer polymer chains to the outer surface of the silica followed by attachment of the shorter chains. This is readily achieved through a simple stepwise addition of the respective reagents. The advantage is an increased level of functional groups bound to the silica thus achieving higher target loading.

Other advantages include high thermal stability, fixed and rigid structures, good stability over a wide range of chemical conditions, insolubility in organic solvents, high shelf life, easily purified and high reusability.

Further advantages include the hydrophobic/hydrophilic balance on the surface of the functionalised silica can be readily adapted through the inclusion of longer chains, higher levels of polymerisation and the incorporation of hydrophobic alkyl and aryl chains. These hydrophobic/hydrophilic effects influence the wetting properties of the surface of the functionalised material with the stream being treated and facilitate higher levels of target removal.

Applications for these new compounds are as purification materials for inorganic and organic compounds from product, process and waste streams, cation and anion exchangers, metal chromatography materials, solid phase extraction or purification materials, removal and purification of biological compounds, catalysts, catalyst immobilisation supports, biomolecule immobilisation supports, anti-microbial agents, hydrophilicity modifiers, flame proofing agents, antistatic agents, solid phase synthesis materials and chromatography materials.

In addition the processes for the preparation of compounds of General Formula I are very simple and flexible and utilise new chemical methods and processes to make polyorganic functional compounds, oligomers and polymers as well as known starting materials. The functional group complexity can be readily built up through a series of stepwise reactions conducted in the same reactor. The processes have a further advantage of having multiple covalent attachment of a range of functional groups to the surface thus ensuring greater long term stability and very low levels of leaching.

The $R^{1-6}$ groups may independently be linear or branched and/or may be substituted with one or more substituents but preferably contain only hydrogen and carbon atoms. If a substituent is present, it may be selected from chloro, fluoro, bromo, nitrile, hydroxyl, carboxylic acid, carboxylic esters, mercaptan, sulfides, sulfoxides, sulfones, $C_{1-6}$-alkoxy group, $C_{1-22}$-alkyl group or aryl di substituted phosphine, amino, amino $C_{1-22}$-alkyl or amino di ($C_{1-22}$-alkyl). Preferably $R^{1-6}$ are independently selected from a linear or branched $C_{1-12}$-alkyl group, $C_{2-12}$-alkenyl group, aryl group and a $C_{1-22}$-alkylaryl group and it is especially preferred that these groups are independently selected from a linear or branched $C_{1-8}$-alkyl group, $C_{2-8}$-alkenyl group, aryl group and $C_{1-8}$-alkylaryl group. The term aryl refers to a five or six member cyclic, 8-10 member bicyclic or 10-13 member tricyclic group with aromatic character and includes systems which contain one or more heteroatoms, for example N, O or S. Examples of suitable aryl groups include phenyl, pyridinyl and furanyl. Where the term "alkylaryl" is employed herein, the immediately preceding carbon atom range refers to the alkyl substituent only and does not include any aryl carbon atoms.

Compositions of General Formula I in which Y is Si(O4/2); X is $(O_{3/2})SiC_3H_6SH$; $B^1$ is $[(O_{3/2})Si-(CH_2)_3SCH_2CH_2CH_2SH]_{b1}$ $[(O_{3/2})Si(CH_2)_3SCH_2CH_2CH_2SCH_2CH_2CH_2SH]_{b2}$ $[(O_{3/2})Si(CH_2)_3SCH_2CH_2CH_2S—CH_2CH_2SCH_2CH_2CH_2S(CH_2)_nSi(O_{3/2})]_{b3}$; $B^2$ is $[(O_{3/2})Si(CH_2)_3SCH_2CH_2CH_2SH]_{b1}$ $[(O_{3/2})Si(CH_2)_3SCH_2—CH_2CH_2SCH_2CH_2CH_2SH]_{b2}$ $[(O_{3/2})Si(CH_2)_3SCH_2CH_2CH_2SCH_2CH_2CH_2SCH_2CH_2CH_2S(CH_2)_3Si(O_{3/2})]_{b3}$; $C^1$ is $[(O_{3/2})Si(CH_2)_2SCH_2CH_2SCH_2CH_2SCH_2CH_2SH]_{c1}$ $[(O_{3/2})Si(CH_2)_2SCH_2CH_2SCH_2CH_2SCH_2CH_2S—(CH_2)_2Si(O_{3/2})]_{c2}$; $C^2$ is $[(O_{3/2})Si(CH_2)_2SCH_2CH_2CH_2SCH_2CH_2SCH_2CH_2CH_2SH]_{c1}$ $[(O_{3/2})Si(CH_2)_2SCH_2CH_2CH_2SCH_2CH_2SCH_2CH_2CH_2S(CH_2)_2Si(O_{3/2})]_{c2}$; $D^1$ is $[(O_{3/2})Si(CH_2)_2SCH_2CH_2SCH_2CH_2CH_2SH]_{d1}$ $[(O_{3/2})Si(CH_2)_2SCH_2CH_2S(CH_2)_2Si(O_{3/2})]_{d2}$; $D^2$ is $[(O_{3/2})Si(CH_2)_2SCH_2CH_2CH_2SCH_2CH_2CH_2SH]_{d1}$ $[(O_{3/2})Si(CH_2)_2SCH_2CH_2CH_2S(CH_2)_2Si(O_{3/2})]_{d2}$; $D^3$ is $[(O_{3/2})Si(CH_2)_2SCH_2CH_2CH_2S—CH_2CH_2SCH_2CH_2CH_2SH]_{d1}$ $[(O_{3/2})Si(CH_2)_2 SCH_2CH_2CH_2S (CH_2)_2Si(O_{3/2})]_{d2}$; $D^6$ is $[(O_{3/2})Si(CH_2)_2SCH_2CH_2CH_2SCH_2CH_2CH_2SCH_2CH_2CH_2SH]di$ $[(O_{3/2})Si(CH_2)_2SCH_2CH_2CH_2S(CH_2)_2Si(O_{3/2})]_{d2}$; E is $[(O_{3/2})Si(CH_2)_3SCH_2CH_2CH_2NR^3R^4]$; F is $[(O_{3/2})Si(CH_2)_2SCH_2CH_2CH_2SR]_{f1}[(O_{3/2})Si(CH_2)_2SCH_2CH_2—CH_2S(CH_2)_2Si(O_{3/2})]_{f2}$; G is $[(O_{3/2})Si(CH_2)_2SCH_2CH_2SR]_{g1}$ $[(O_{3/2})Si(CH_2)_2SCH_2CH_2S(CH_2)_2Si(O_{3/2})]_{g2}$; U is $Si(CH_2)_3S(CH_2)_3NHC(=S)NH_2$; are preferred wherein R is selected from a hydrogen, $C_{1-12}$-alkyl group, $C_{2-22}$-alkenyl group, $C_{1-12}$-aryl group, $C_{1-12}$-alkylaryl group and $CO\ CH_3$; $R^1$ is a group which is optionally substituted and selected from a $C_{1-22}$-alkyl group, $C_{2-22}$-alkenyl group, phenyl group, alkyl amine group, alkyl polyalkyl amine group and a mercaptoalkyl group; $R^3$ and $R^4$ are either independently selected from a hydrogen, $C_{1-22}$-alkyl group, $C_{1-22}$-aryl group, $C_{1-22}$-heteroaryl group, $C_{1-22}$-alkylaryl group, alkyl amine group, alkyl polyalkyl amine group or a trialkyl ammonium group; 1b, 1b1-3, 2b, 2b1-3, 1c, 1c1-2, 2c, 2c1-2, 1d, 1d1-2, 2d, 2d1-2, 3d, 3d1-2, 4d, 4d1-2, 5d, 5d1-2, 6d, 6d1-2, e, f, f1-2, g, g1-2, u, x and y are integers such that the ratio of y: (1 and 2)b+(1 and 2)c+(1 to 6)d+e+f+g+u+x is from 0.01 to 1,000; and respectively each of the following ratios 1b2:1b1+1b3; 2b2:2b1+2b3; 1c1:1c2; 2c1:2c2; 1d1:1d2; 2d1:2d2; 3d1:3d2; 4d1:4d2; 5d1:5d2; 6d1:6d2; f1:f2 and g1:g2 vary independently between 0.01 to 100; and the component Y and at least one of the following components $B^{1-2}$, $C^{1-2}$ and $D^{1-6}$ are always present.

Compositions of General Formula I in which Y is $Si(O_{4/2})$; X is $(O_{3/2})SiC_3H_6SH$; $B^1$ is $[(O_{3/2})Si(CH_2)_3SCH_2CH_2CH_2SH]_{b1}$ $[(O_{3/2})Si(CH_2)_3SCH_2CH_2CH_2SCH_2CH_2CH_2SH]_{b2}$ $[(O_{3/2})Si(CH_2)_3SCH_2—CH_2CH_2SCH_2CH_2SCH_2CH_2CH_2S(CH_2)_3Si(O_{3/2})]_{b3}$; $B^2$ is $[(O_{3/2})Si(CH_2)_3SCH_2CH_2CH_2SH]_{b1}$ $Si—(CH_2)_3SCH_2CH_2CH_2SCH_2CH_2CH_2SH]_{b2}$ $[(O_{3/2})Si(CH_2)_3SCH_2CH_2CH_2SCH_2CH_2CH_2SCH_2CH_2CH_2S—(CH_2)_3Si(O_{3/2})]_{b3}$; $D^1$ is $[(O_{3/2})Si(CH_2)_2SCH_2CH_2SCH_2CH_2CH_2SH]_{d1}$ $[(O_{3/2})Si(CH_2)_2SCH_2CH_2S(CH_2)_2—Si(O_{3/2})]_{d2}$; $D^2$ is $[(O_{3/2})Si(CH_2)_2SCH_2—CH_2CH_2SCH_2CH_2CH_2SH]_{d1}$ $[(O_{3/2})Si(CH_2)_2SCH_2CH_2CH_2S(CH_2)_2—Si(O_{3/2})]_{d2}$; $D^3$ is $[(O_{3/2})Si(CH_2)_2S—CH_2CH_2SCH_2CH_2CH_2SCH_2CH_2SH]_{d1}$ $[(O_{3/2})Si(CH_2)_2SCH_2CH_2S(CH_2)_2Si(O_{3/2})]_{d2}$; $D^4$ is $[(O_{3/2})Si(CH_2)_2SCH_2CH_2SCH_2CH_2CH_2SCH_2CH_2CH_2SH]_{d1}$ $[(O_{3/2})Si—(CH_2)_2SCH_2CH_2S(CH_2)_2Si(O_{3/2})]_{d2}$; $D^5$ is $[(O_{3/2})Si(CH_2)_2SCH_2CH_2SCH_2CH_2CH_2SCH_2CH_2CH_2SH]_{d1}$ $[(O_{3/2})Si(CH_2)_2S—CH_2CH_2SCH_2(CH_2)_2—Si(O_{3/2})]_{d2}$; $D^6$ is $[(O_{3/2})Si(CH_2)_2SCH_2CH_2CH_2SCH_2CH_2CH_2SH]_{d1}$ $[(O_{3/2})Si(CH_2)_2SCH_2CH_2CH_2S(CH_2)_2Si(O_{3/2})]_{d2}$; E is $[(O_{3/2})Si(CH_2)_3SCH_2CH_2CH_2NR^3R^4]$; F is $[(O_{3/2})Si—(CH_2)_2SCH_2—CH_2CH_2SR]_{f1}[(O_{3/2})Si(CH_2)_2SCH_2CH_2CH_2S(CH_2)_2Si(O_{3/2})]_{f2}$; G is $[(O_{3/2})Si(CH_2)_2SCH_2CH_2—SR]_{g1}$ $[(O_{3/2})Si(CH_2)_2SCH_2CH_2S(CH_2)_nSi(O_{3/2})]_{g2}$; U is $Si(CH_2)_3S(CH_2)_3NHC(=S)NH_2$; are especially preferred wherein R is hydrogen, $C_{2-22}$-alkenyl group and $CO\ CH_3$; 1b, 1b1-3, 2b, 2b1-3, 1d, 1d1-2, 2d, 2d1-2, 3d, 3d1-2, 4d, 4d1-2, 5d, 5d1-2, 6d, 6d1-2, e, f, f1-2, g, g1-2, x and y are integers such that the ratio of y: (1 and 2)b+(1 to 6)d+e+f+g+u+x is from 0.01 to 100; and respectively each of the following ratios 1b2:1b1+1b3; 2b2:2b1+2b3; 1d1:1d2; 2d1:2d2; 3d1:3d2; 4d1:4d2; 5d1:5d2; 6d1:6d2; f1:f2 and g1:g2 vary independently between 0.01 to 100 and the component Y and at least one of the following components $B^{1-2}$ and $D^{1-6}$ are always present.

Compositions of General Formula I in which Y is $Si(O4/2)$; X is $(O_{3/2})SiC_3H_6SH$; E is $[(O_{3/2})$ Si(CH$_2$)$_3$SCH$_2$CH$_2$CH$_2$NR$^3$R$^4$]; F is [(O$_{3/2}$)Si(CH$_2$)$_2$SCH$_2$CH$_2$CH$_2$SR]$_{f1}$[(O$_{3/2}$)Si(CH$_2$)$_2$SCH$_2$CH$_2$—CH$_2$S(CH$_2$)$_2$Si(O$_{3/2}$)]$_{f2}$; G is [(O$_{3/2}$)Si(CH$_2$)$_2$SCH$_2$CH$_2$SR]$_{g1}$[(O$_{3/2}$)Si(CH$_2$)$_2$SCH$_2$CH$_2$S(CH$_2$)$_2$Si(O$_{3/2}$)]$_{g2}$; U is Si(CH$_2$)$_3$S(CH$_2$)$_3$NHC(=S)NH$_2$; are preferred wherein R is selected from a hydrogen, C$_{1-12}$-alkyl group, C$_{2-22}$-alkenyl group, C$_{1-12}$-aryl group, C$_{1-12}$-alkylaryl group and CO CH$_3$; R$^1$ is a group which is optionally substituted and selected from a C$_{1-12}$-alkyl group, C$_{2-12}$-alkenyl group, C$_{2-12}$-alkynyl group, aryl group, alkyl amine group, alkyl polyalkyl amine group and a mercaptoalkyl group; R$^3$ and R$^4$ are either independently selected from a hydrogen, C$_{1-22}$-alkyl group, C$_{1-22}$-aryl group, C$_{1-22}$-heteroaryl group, C$_{1-22}$-alkylaryl group, alkyl amine group, alkyl polyalkyl amine group, trialkyl ammonium group or both R$^3$ and R$^4$ are part of a C$_{3-12}$-cyclic alkyl or hetero alkyl group; e, f, f1-2, g, g1-2, x and y are integers such that the ratio of y:e+f+g+x is from 0.01 to 1,000; f1:f2 and g1:g2 vary independently between 0.01 to 100 and in General Formula I the components Y and E are always present.

Compositions of General Formula I in which Y is Si(O$_{4/2}$); X is (O$_{3/2}$)SiC$_3$H$_6$SH; F is [(O$_{3/2}$)Si(CH$_2$)$_2$SCH$_2$—CH$_2$CH$_2$SR]$_{f1}$[(O$_{3/2}$)Si(CH$_2$)$_n$SCH$_2$CH$_2$CH$_2$S(CH$_2$)$_2$Si(O$_{3/2}$)]$_{f2}$; G is [(O$_{3/2}$)Si(CH$_2$)$_2$S—CH$_2$CH$_2$SR]$_{g1}$[(O$_{3/2}$)Si(CH$_2$)$_2$SCH$_2$CH$_2$S(CH$_2$)$_2$Si(O$_{3/2}$)]$_{g2}$; H is [(O$_{3/2}$)Si(CH$_2$)$_2$SCH$_2$CH$_2$S(CH$_2$)$_3$NZR]; J is [(O$_{3/2}$)Si(CH$_2$)$_2$SCH$_2$CH$_2$CH$_2$S(CH$_2$)$_3$NZR]; K is [(O$_{3/2}$)Si(CH$_2$)$_2$SCH$_2$CH$_2$S((CH$_2$)$_3$NZ(CH$_2$)$_3$SCH$_2$CH$_2$S)$_x$R]$_{k1}$[(O$_{3/2}$)Si(CH$_2$)$_2$SCH$_2$CH$_2$S((CH$_2$)$_3$NZ(CH$_2$)$_3$SCH$_2$CH$_2$S)$_v$(CH$_2$)$_2$Si(O$_{3/2}$)]$_{k2}$[(O$_{3/2}$)Si(CH$_2$)$_2$S—CH$_2$CH$_2$S((CH$_2$)$_3$NZ(CH$_2$)$_3$SCH$_2$CH$_2$S)$_i$(CH$_2$)$_3$NZR]$_{k3}$; M is [(O$_{3/2}$)Si(CH$_2$)$_2$SCH$_2$CH$_2$CH$_2$S((CH$_2$)$_3$NZ(CH$_2$)$_3$SCH$_2$CH$_2$CH$_2$S)$_x$R]$_{m1}$[(O$_{3/2}$)Si(CH$_2$)$_2$SCH$_2$CH$_2$CH$_2$S((CH$_2$)$_3$NZ(CH$_2$)$_3$SCH$_2$CH$_2$CH$_2$S)$_v$(CH$_2$)$_2$Si(O$_{3/2}$)]$_{m2}$[(O$_{3/2}$)Si(CH$_2$)$_2$SCH$_2$CH$_2$CH$_2$S((CH$_2$)$_3$NZ(CH$_2$)$_3$SCH$_2$CH$_2$CH$_2$S)$_i$(CH$_2$)$_3$NZR]$_{m3}$; U is Si(CH$_2$)$_3$S(CH$_2$)$_3$NHC(=S)NH$_2$; are preferred wherein Z is selected from a hydrogen, C$_{1-12}$-alkyl group, C$_{2-22}$-alkenyl group, C$_{1-22}$-aryl group, CO NHR$^5$, CS NHR$^5$ and CO OR$^5$; R is selected from a hydrogen, C$_{1-12}$-alkyl group, C$_{2-22}$-alkenyl group, C$_{1-12}$-aryl group, C$_{1-22}$-alkylaryl group and CO CH$_3$; R$^1$ is a group which is optionally substituted and selected from a C$_{1-22}$-alkyl group, C$_{2-12}$-alkenyl group, aryl group, alkyl amine group, alkyl polyalkyl amine group and a mercaptoalkyl group; R$^5$ is selected from a hydrogen, C$_{1-12}$-alkyl group, C$_{2-12}$-alkenyl group and a C$_{1-22}$-aryl group; i, x and v are independent integers from 1 to 100; f, f1-2, g, g1-2, h, j, k, k1-3, m, m1-3, u, x and y are integers such that the ratio of y:f+g+h+j+k+m+u+x is from 0.01 to 1,000; f1:f2; g1:g2; k1:k3; k1:k2+k3; m1:m3 and m1:m2+m3, vary independently between 0.01 to 100 and in General Formula I the component Y and at least one of the following components H, J, K, M and U are always present.

Compositions of General Formula I in which Y is Si(O$_{4/2}$); X is (O$_{3/2}$)SiC$_3$H$_6$SH, F is [(O$_{3/2}$)Si(CH$_2$)$_2$SCH$_2$—CH$_2$CH$_2$SR]$_{f1}$[(O$_{3/2}$)Si(CH$_2$)$_2$SCH$_2$CH$_2$CH$_2$S(CH$_2$)$_n$Si(O$_{3/2}$)]$_{f2}$; G is [(O$_{3/2}$)Si(CH$_2$)$_2$S—CH$_2$CH$_2$SR]$_{g1}$[(O$_{3/2}$)Si(CH$_2$)$_2$SCH$_2$CH$_2$S(CH$_2$)$_2$Si(O$_{3/2}$)]$_{g2}$; H is [(O$_{3/2}$)Si(CH$_2$)$_2$SCH$_2$CH$_2$S(CH$_2$)$_3$NZR]; J is [(O$_{3/2}$)Si(CH$_2$)$_2$SCH$_2$CH$_2$CH$_2$S(CH$_2$)$_3$NZR]; K is [(O$_{3/2}$)Si(CH$_2$)$_2$SCH$_2$CH$_2$S((CH$_2$)$_3$NZ(CH$_2$)$_3$SCH$_2$CH$_2$S)$_x$R]$_{k1}$[(O$_{3/2}$)Si(CH$_2$)$_2$SCH$_2$CH$_2$S((CH$_2$)$_3$NZ(CH$_2$)$_3$SCH$_2$CH$_2$S)$_v$(CH$_2$)$_2$Si(O$_{3/2}$)]$_{k2}$[(O$_{3/2}$)Si(CH$_2$)$_2$SCH$_2$CH$_2$S((CH$_2$)$_3$NZ(CH$_2$)$_3$SCH$_2$CH$_2$S)$_i$(CH$_2$)$_3$NZR]$_{k3}$; M is [(O$_{3/2}$)Si(CH$_2$)$_2$SCH$_2$CH$_2$CH$_2$S((CH$_2$)$_3$NZ(CH$_2$)$_3$SCH$_2$CH$_2$CH$_2$S)$_x$R]$_{m1}$[(O$_{3/2}$)Si(CH$_2$)$_2$SCH$_2$CH$_2$CH$_2$S((CH$_2$)$_3$NZ(CH$_2$)$_3$SCH$_2$CH$_2$CH$_2$S)$_v$(CH$_2$)$_n$Si(O$_{3/2}$)]$_{m2}$[(O$_{3/2}$)Si(CH$_2$)$_2$SCH$_2$CH$_2$CH$_2$S((CH$_2$)$_3$NZ(CH$_2$)$_3$SCH$_2$CH$_2$CH$_2$S)$_i$(CH$_2$)$_3$NZR]$_{m3}$ are especially preferred wherein Z is selected from a hydrogen, C$_{1-12}$-alkyl group, C$_{2-22}$-alkenyl group, CO NHR$^5$ and CS NHR$^5$; R is selected from hydrogen and CO CH$_3$; R$^1$ is a group which is optionally substituted and selected from a C$_{1-12}$-alkyl group, C$_{2-22}$-alkenyl group, phenyl group, alkyl amine group, alkyl polyalkyl amine group and a mercaptoalkyl group; R$^5$ are independently selected from a hydrogen, C$_{1-12}$-alkyl group and a C$_{1-22}$-aryl group; i, x and v are independent integers from 1 to 50; f, f1-2, g, g1-2, h, j, k, k1-3, m, m1-3, x and y are integers such that the ratio of y:f+g+h+j+k+m+x is from 0.01 to 1,000; f1:f2; g1:g2; k1:k3; k1:k2+k3; m1:m3 and m1:m2+m3, vary independently between 0.01 to 100; and in General Formula I the component Y and at least one of the following components H, J, K and M are always present.

Compositions of General Formula I in which Y is Si(O$_{4/2}$); X is (O$_{3/2}$)SiC$_3$H$_6$SH; F is [(O$_{3/2}$)Si(CH$_2$)$_2$SCH$_2$—CH$_2$CH$_2$SR]$_{f1}$[(O$_{3/2}$)Si(CH$_2$)$_2$SCH$_2$CH$_2$CH$_2$S(CH$_2$)$_n$Si(O$_{3/2}$)]$_{f2}$; G is [(O$_{3/2}$)Si(CH$_2$)$_2$S—CH$_2$CH$_2$SR]$_{g1}$[(O$_{3/2}$)Si(CH$_2$)$_2$SCH$_2$CH$_2$S(CH$_2$)$_2$Si(O$_{3/2}$)]$_{g2}$; H is [(O$_{3/2}$)Si(CH$_2$)$_2$SCH$_2$CH$_2$S(CH$_2$)$_3$NZR]; J is [(O$_{3/2}$)Si(CH$_2$)$_2$SCH$_2$CH$_2$CH$_2$S(CH$_2$)$_3$NZR]; P is [(O$_{3/2}$)Si(CH$_2$)$_2$SCH$_2$CH$_2$CH$_2$S((CH$_2$)$_2$T(CH$_2$)$_2$SCH$_2$CH$_2$S)$_x$R]$_{p1}$[(O$_{3/2}$)Si(CH$_2$)$_2$SCH$_2$CH$_2$CH$_2$S((CH$_2$)$_2$T(CH$_2$)$_2$SCH$_2$CH$_2$S)$_v$(CH$_2$)$_2$Si(O$_{3/2}$)]$_{p2}$[(O$_{3/2}$)Si—(CH$_2$)$_2$SCH$_2$CH$_2$CH$_2$S((CH$_2$)$_2$T(CH$_2$)$_2$SCH$_2$CH$_2$CH$_2$S)$_i$(CH$_2$)$_2$TR]$_{p3}$; U is Si(CH$_2$)$_3$S(CH$_2$)$_3$NHC(=S)NH$_2$; are preferred wherein T is an optionally substituted C$_{2-12}$-alkyl group, C$_{2-12}$-aryl group, C$_{2-22}$-heteroaryl group and a C$_{2-22}$-alkylaryl group; R is selected from a hydrogen and CO CH$_3$; R$^1$ is a group which is optionally substituted and selected from a C$_{1-12}$-alkyl group, C$_{2-12}$-alkenyl group, aryl group, alkyl amine group, alkyl polyalkyl amine group and a mercaptoalkyl group; R$^5$ is selected from a hydrogen, C$_{1-12}$-alkyl group, C$_{2-12}$-alkenyl group and a C$_{1-22}$-aryl group; i, x and v are independent integers from 1 to 100; f, f1-2, g, g1-2, h, j, p, p1-3, u, x and y are integers such that the ratio of y:f+g+h+j+p+u+x is from 0.01 to 1,000; f1:f2; g1:g2; p1:p3; p1:p2+p3;u vary independently between 0.01 to 100 and in General Formula I the component Y and at least one of the following components H, J, P and U are always present.

The invention also provides novel precursor compounds for General Formula I, the precursor being of General Formula II (R$^6$O)$_3$Si(CH$_2$)$_n$SQ where Q is (CH$_2$)$_3$Cl, (CH$_2$)$_n$NR$^3$R$^4$, S(CH$_2$)$_3$S(CH$_2$)$_2$SH, S(CH$_2$)$_3$S(CH$_2$)$_3$SH, CH$_2$CH$_2$S(CH$_2$)$_3$NZR, CH$_2$CH$_2$CH$_2$S(CH$_2$)$_3$NZR, CH$_2$CH$_2$S((CH$_2$)$_3$NZ(CH$_2$)$_3$SCH$_2$—CH$_2$S)$_x$R$^7$, CH$_2$CH$_2$CH$_2$S((CH$_2$)$_3$NZ(CH$_2$)$_3$SCH$_2$CH$_2$CH$_2$S)$_x$R$^7$, CH$_2$CH$_2$S(CH$_2$)$_2$T(CH$_2$)$_2$SCH$_2$CH$_2$S)$_x$R$^7$ or CH$_2$CH$_2$CH$_2$S((CH$_2$)$_2$T(CH$_2$)$_2$SCH$_2$CH$_2$CH$_2$S)$_x$R$^7$ and R$^6$ is selected from a C$_{1-22}$-alkyl group and a C$_{1-22}$-aryl group; R$^7$ is hydrogen or (CH$_2$)$_n$Si(O$_{3/2}$); wherein Z is selected from a hydrogen, C$_{1-12}$-alkyl group, C$_{2-22}$-alkenyl group and CO NHR$^5$; n is an integer from 2 to 3; R is selected from hydrogen or CO CH$_3$; R$^3$ and R$^4$ are either independently selected from a hydrogen, C$_{1-22}$-alkyl group, C$_{1-22}$-aryl group, C$_{1-22}$-heteroaryl group, C$_{1-22}$-alkylaryl group, alkyl amine group, alkyl polyalkyl amine group, trialkyl ammonium group or both part of a C$_{3-12}$-cyclic alkyl or hetero alkyl group; R$^5$ is selected from a hydrogen, C$_{1-12}$-alkyl group, C$_{2-12}$-alkenyl group and a C$_{1-22}$-aryl group; T is an optionally substituted C$_{2-12}$-alkyl group, C$_{2-12}$-aryl group, C$_{2-22}$-heteroaryl group and C$_{2-22}$-alkylaryl group and x is an integer from 1 to 100.

The invention also provides a process of producing the precursor of General Formula II $(R^6O)_3Si(CH_2)_nSQ$ through either a) a radical reaction between a compound of General Formula IV $(R^6O)_3SiR^8$, where $R^8$ is either a vinyl or allyl group, with the mercaptan HSQ with or without a solvent at temperatures between 20-160° C. for 0.5 to 24 hours and using known radical initiators such as AIBN and di-tert-butyl peroxide or b) a radical reaction between a compound of General Formula V $(R^6O)_3Si(CH_2)_3SH$ with a functionalised alkene or alkyne such as allyl halide followed by further radical and substitution reactions. Typical solvents include xylene, toluene, heptane, glycols, ethanol and methanol.

The invention also provides further novel precursor compounds for General Formula I, the precursor being of General Formula VI $(R^6O)_3Si(CH_2)_3S[CH_2CH(CH_2M)(CH_2CHCH_2M)_u]H$ where M is a halide, amine or polyalkyl amine, hydroxy or a thiourea NH CS NHR5 and R5 is selected from a hydrogen, $C_{1-12}$-alkyl group, $C_{2-12}$-alkenyl group and a $C_{1-22}$-aryl group and the integer u is 1 to 40.

These radical reactions with these combinations of reactants proceed with high conversion and produce a number of different structural fragments with different combinations of multiple functional groups. Thereby in a simple process in a single reaction pot the desired functionalised material is produced which has a diverse range of complex multi-functional groups with high performance for the application. For example in General Formula I the fragments B and C can consist of the following structures; for B there is $B^1$ $[(O_{3/2})Si(CH_2)_3SCH_2CH_2CH_2SH]_{b1}$ $[(O_{3/2})Si(CH_2)_3SCH_2CH_2CH_2SCH_2CH_2SH]_{b2}$ $[(O_{3/2})Si(CH_2)_3SCH_2CH_2CH_2SCH_2CH_2SCH_2CH_2CH_2S(CH_2)_3Si(O_{3/2})]b3$ and $B^2$ $[(O_{3/2})Si(CH_2)_3SCH_2CH_2CH_2SH]_{b1}$ $[(O_{3/2})Si(CH_2)_3SCH_2CH_2CH_2SCH_2CH_2CH_2SH]_{b2}$ $[(O_{3/2})Si(CH_2)_3SCH_2CH_2CH_2SCH_2CH_2CH_2SCH_2-CH_2S(CH_2)_3Si(O_{3/2})]_{b3}$ and for C there is $[(O_{3/2})Si(CH_2)_2SCH_2CH_2SCH_2CH_2SCH_2CH_2SH]_{c1}$ $[(O_{3/2})Si(CH_2)_2SCH_2CH_2SCH_2CH_2SCH_2CH_2S(CH_2)_2Si(O_{3/2})]_{c2}$; $C^2$ $[(O_{3/2})Si(CH_2)_2SCH_2CH_2CH_2S—CH_2CH_2SCH_2CH_2CH_2SH]_{c1}$ $[(O_{3/2})Si(CH_2)_2SCH_2CH_2CH_2SCH_2CH_2SCH_2CH_2CH_2S(CH_2)_2Si(O_{3/2})]_{c2}$; $C^3$ $[(O_{3/2})Si(CH_2)_3SCH_2CH_2SCH_2CH_2SCH_2CH_2CH_2SR]_{c1}$ $[(O_{3/2})Si(CH_2)_3SCH_2CH_2CH_2SCH_2CH_2S—CH_2CH_2CH_2S(CH_2)_3Si(O_{3/2})]_{c2}$ and $C^4$ $[(O_{3/2})Si(CH_2)_3SCH_2CH_2CH_2SCH_2CH_2CH_2SCH_2CH_2CH_2SR]_{c1}$ $[(O_{3/2})Si(CH_2)_3SCH_2CH_2CH_2SCH_2CH_2CH_2SCH_2CH_2CH_2S(CH_2)_3Si(O_{3/2})]_{c2}$.

For compound HSQ where Q is $CH_2CH_2S(CH_2)_3NZR$ or $CH_2CH_2CH_2S(CH_2)_3NZR$ another aspect of the invention involves reaction with either the dimercaptans or mixtures thereof of $HSCH_2CH_2SH$ and $HSCH_2CH_2CH_2SH$ with $CH_2CHCH_2NZR$ with or without a solvent at temperatures between 20-160° C. for 0.5 to 24 hours and using known radical initiators such as AIBN or di-tert-butyl peroxide, wherein Z is selected from a hydrogen, $C_{1-12}$-alkyl group, $C_{2-22}$-alkenyl group, CO $NHR^5$ and CS $NHR^5$ and $R^5$ is independently selected from a hydrogen, $C_{1-22}$-alkyl group, $C_{2-22}$-alkenyl group and a $C_{1-22}$-aryl group.

For compound HSQ where Q is $CH_2CH_2S((CH_2)_3NZ(CH_2)_3SCH_2CH_2S)_xH$, or $CH_2CH_2CH_2S((CH_2)_3NZ—(CH_2)_3SCH_2CH_2CH_2S)_xH$, another aspect of the invention involves reaction with either the dimercaptans $HSCH_2CH_2SH$ and $HSCH_2CH_2CH_2SH$ or mixtures thereof with $CH_2CHCH_2NZCH_2CHCH_2$ or triallyl amine with or without a solvent at temperatures between 20-160° C. for 0.5 to 24 hours and using known radical initiators such as AIBN, tert-butyl hydroperoxide or di-tert-butyl peroxide, wherein Z is selected from hydrogen, $C_{1-12}$-alkyl group, $C_{2-22}$-alkenyl group, CO $NHR^5$ and CS $NHR^5$; $R^5$ is independently selected from a hydrogen, $C_{1-22}$-alkyl group, $C_{2-22}$-alkenyl group and $C_{1-22}$-aryl group and x is an integer from 1 to 100. The extent of the polymerisation is readily controlled by the respective ratios of the starting materials and the temperature and duration of the reaction.

For compound HSQ where Q is $CH_2CH_2S((CH_2)_2T(CH_2)_2SCH_2CH_2S)_xH$ or $CH_2CH_2CH_2S((CH_2)_2T-(CH_2)_2SCH_2CH_2CH_2S)_xH$, another aspect of the invention involves reaction with either the dimercaptans $HSCH_2CH_2SH$ and $HSCH_2CH_2CH_2SH$ with the di-alkene $CH_2CHTCHCH_2$ with or without a solvent at temperatures between 20-160° C. for 0.5 to 24 hours and using known radical initiators such as AIBN or di-tert-butyl peroxide, wherein T is selected from a $C_{1-22}$-alkyl group, $C_{2-22}$-alkenyl group, aryl group, heteroaryl group or a cyclic alkyl or hetero alkyl group and x is an integer from 1 to 100. Also included for the di-alkenes are compounds where one or more of the double bonds is in a cyclic fragment. The extent of the polymerisation depends on the respective ratios of the starting materials, the nature of T and the temperature and duration of the reaction.

The invention also provides processes for producing compounds of General Formula I. The inclusion of multiple different functional groups, the variation in their relative compositions and their numerous different configurations and spatial arrangements within compounds of General Formula I can be readily achieved using a sequence of novel high yielding radical and substitution reactions coupled with variations in the nature and composition of the starting reagents and process conditions.

In the first process, respective mixtures of various compounds of General Formula II $(R^6O)_3Si(CH_2)_nSQ$, a compound of General Formula V $(R^6O)_3Si(CH_2)_3SH$ and $R_zR^1Si(OR^6)_q$ where q is an integer from 1 to 3; n is an integer from 2 to 3; z is an integer from 0 to 2 such that q+z=3; R is selected from a hydrogen, $C_{1-22}$-alkyl group, $C_{1-22}$-aryl group, $C_{1-22}$-alkylaryl group and an acyl group CO $R^2$; $R^1$ is a group which is optionally substituted and selected from a $C_{1-22}$-alkyl group, $C_{2-22}$-alkenyl group, $C_{2-22}$-alkynyl group, aryl group, alkyl amine group, alkyl polyalkyl amine group and a mercaptoalkyl group; $R^2$ is selected from a $C_{1-22}$-alkyl group, $C_{2-22}$-alkenyl group and $C_{1-22}$-aryl group; $R^6$ is a group which is optionally substituted and selected from a $C_{1-22}$-alkyl group; are reacted with silica in a solvent at temperatures between 20-160° C. for 0.5 to 24 hours. Typical solvents include toluene, xylene, heptane, ethanol and methanol. At the end of the reaction the polyorganic functional groups modified silica is separated either through filtration or centrifugation then washed well to remove any residual reactants and finally dried. The process can be applied to a wide range of commercially available silica, ranging in particle sizes and distributions from nano sized particles to 5-30 mm and also a wide range and distribution of known pore dimensions. Preferred pore diameters range from 40 to 250 Å.

In a further process, sol gel, respective mixtures of various compounds of General Formula II $(R^6O)_3Si(CH_2)_nSQ$, a compound of General Formula V $(R^6O)_3Si(CH_2)_3SH$ and $R_zR^1Si(OR^6)_q$ where q is an integer from 1 to 3; z is an integer from 0 to 2 such that q+z=3; R is selected from a hydrogen, $C_{1-22}$-alkyl group, $C_{1-22}$-aryl group, $C_{1-22}$-alkylaryl group and an acyl group CO $R^2$; $R^1$ is a group which is optionally substituted and selected from a $C_{1-22}$-alkyl group, $C_{2-22}$-alkenyl group, $C_{2-22}$-alkynyl group, aryl group, alkyl amine group, alkyl polyalkyl amine group and a mercaptoalkyl group; $R^2$ is selected from a $C_{1-22}$-alkyl group, $C_{2-22}$-alkenyl group and a $C_{1-22}$-aryl group; $R^6$ is a group which is optionally substituted and selected from a $C_{1-22}$-alkyl group, are reacted with either sodium silicate or an alkoxy silane such as tetraethyl orthosilicate with either an acid or base catalyst in a solvent at temperatures between 20-160° C. for 0.5 to 48 hours. The solid is then milled, washed to remove any residual reactants and dried. Typical acids and bases used, but not limited to, are hydrochloric acid and aqueous ammonia respectively. Solvents include but not limited to methanol, ethanol and water and mixtures thereof.

Compounds of General Formula II can be applied either singly or as mixtures as thin films onto a variety of surfaces using a variety of well known methodology.

Compounds of General Formula I may be linked to a metal complex, for example as a ligand. A further aspect of the invention provides compounds of General Formula I further comprising a metal complex $M(L)_t$ where M is derived from a lanthanide, actinide, main group or transition metal with oxidation states ranging from 0 to 4 and L is one or more optionally substituted ligands selected from halide, nitrate, acetate, carboxylate, cyanide, amine, sulfate, carbonyl, imine, alkoxy, triaryl or trialkylphosphine and phenoxy and t is an integer from 0 to 8 and where compounds of General Formula I are linked to the said metal complex.

Suitably, M is derived from cobalt, manganese, iron, nickel, palladium, platinum, rhodium or ruthenium, with oxidation states ranging from 0 to 4 and L is one or more optionally substituted ligands selected from halide, nitrate, acetate, amine, carboxylate, cyanide, sulfate, carbonyl, imine, alkoxy, triaryl or trialkylphosphine and phenoxy and t is an integer from 0 to 4.

Compounds of General Formula I have a wide range of uses. The present invention provides a process for treating a feed material comprising, contacting compounds of General Formula I with a feed material:
to remove a component or components of the feed material so as to produce a material depleted in the removed component;
to effect a chemical reaction by catalytic transformation of a component of the feed material to produce a desired product;
to separate different components on passage through compounds of General Formula I; or
to remove an ionic species in the feed material in an ion exchange process.

The feed material may be a continuous stream for example, a process stream or intermediate stream, or may be in the form of a batch of material for discrete treatment. The feed material, for example a product stream, waste stream or process stream, may be treated to selectively remove components of the feed. The removed component may be an undesirable component in the feed and the process acts to provide a desired composition of the feed material that has been depleted in the selectively removed component after contact with compounds of General Formula I. This process may be used for example in removing unwanted targets from a feed material from a pharmaceutical manufacturing run or formulation process to improve the purity level of the pharmaceutical product as regards the removed component, for example metal species.

The process may be employed to remove desired species from a feed material for subsequent processing or analysis, for example a biological molecule such as an enzyme, peptide, protein, endotoxin and nucleic acid may be removed from a feed material to enable further processing or analysis of the removed components.

Across many different industries and applications, both existing and new, there are key economic, environmental and performance drivers to deliver products with higher purity as well as capturing and recycling precious and critical metals and compounds. Compositions of General Formula I have been designed to possess a wide range of functional groups dispersed within the same composition thereby providing numerous binding mechanisms to facilitate the selective removal of the desired target present as a variety of species and complexes.

Compounds of General Formula I possess the required high affinity to remove metal tightly bound to particular ligands for example, in highly polar active pharmaceutical ingredients. Precious metals such as palladium, platinum and rhodium as well as nickel are used as catalysts to make many different high value products where high purity is required. These metals are present in many different forms at the end of the manufacturing process.

Treatment of such process or product streams containing palladium species bound to the product with any of the products from Examples 1, 3-26, 39-41, 49-61 and 64-66 results in the complete removal of the palladium from solution. For product and process streams containing palladium residues originating from a palladium(0) catalyst, the products from Examples 14-18, 20-26, 31-47 and 64-69 are equally effective for its removal.

Treatment of hydroformylation process streams containing a multitude of rhodium species with products from Examples 9-18, 35-51 and 64-70, achieved residual rhodium levels of less than 1 ppm.

The precious metal platinum is used in numerous different processes and applications. For example platinum catalysts are used in hydrosilylation reactions to produce silanes and silicones and invariably the platinum is either left in the product or only low levels of removal are achieved. Treatment of such product and process streams with compounds of General Formula I result in very low levels of residual platinum in these streams, Examples 1-3, 9-13, 20-26, 32-38, 48, 52, 57-59, 65-67 and 71-75.

There is a growing use of ruthenium catalysts, such as Grubbs' catalysts, in the manufacture of complex compounds for a variety of applications. A significant problem encountered with these toxic catalysts is that the metal is bound to the desired compound at the end of the process and cannot be readily removed using standard methodologies. A further problem is that even low residual levels of ruthenium can further catalyse rearrangements on purification of the reaction product. Compounds of General Formula I are very effective at removing ruthenium from various different solutions with different starting metal concentration ranges. For example, treatment of a process stream containing ruthenium at 5 ppm with any of the products from Examples 14, 21-26, 33-35, 39, 43-45, 57 and 65-66 resulted in the complete removal of the ruthenium from solution.

Process and waste streams in the mining industry contain a range of metals and for the waste stream the desired metals for recovery will be present at very low concentrations whilst the unwanted metals will be in much higher concentrations, an example is precious metals such as platinum, palladium, rhodium, iridium, ruthenium and gold at combined concentrations of 2-20 ppm in solution along with 500-50,000 ppm of iron, copper and zinc. Compounds of General Formula I are very effective at selectively removing the desired precious metals.

Compounds of General Formula I are very effective at abstracting a wide range of cations and anions from various environments. For cations these include the lanthanide, actinide, main group and transition metals. Anions include arsenates, borates, chromates, permanganates, perchlorates and perrhenates.

For example the products from Examples 1-13, 20-26 and 31-39 and 58-61 are very effective for the removal of cuprous and cupric ions from various solutions. Ferrous and ferric ions present in hydroprocessing streams are readily removed using the products from Examples 1-13 and 57-60.

Compounds of General Formula I can be used as functionalised materials to remove excess inorganic or organic reagents and side products from reactions mixtures or from impure chemical products.

Genotoxic agents are capable of causing direct or indirect damage to DNA. One class of genotoxic impurities are alkylating agents such as alkyl halides and sulfonyl esters and halides. As illustrated in Examples 91, 94 and 95 the thiourea groups of General Formula I are very effective at removing compounds containing such groups.

Metal salts/complexes of General Formula I can catalyse a wide range of reactions well known to practitioners of organic and inorganic chemistry. Examples include but not limited to oxidations, reductions, alkylations, carbon-carbon bond formations, polymerisations, hydroformylations, arylations, acylations, isomerisations, carboxylations, carbonylations, esterifications, trans-esterifications and rearrangements. The polyorganic groups modified compounds of General Formula I have many advantages, for example good thermal and chemical stability and broad solvent compatibility.

Another advantage of these catalysts is that on completion of the reaction they can be simply filtered off and reused. No apparent loss of activity is observed. Thus an important application of metal derivatives of General Formula I is their use as heterogeneous catalysts. For example, in Example 92, palladium complexes of compounds of General Formula I catalyse a wide range of carbon-carbon bond formation reactions such as Suzuki, Example 93, and Heck reactions. At the end of these reactions the catalysts can be filtered easily from the reaction mixture and reused.

Compounds of General Formula I can also be used for solid phase synthesis through first attachment of the starting material. A number of chemical reactions can then be conducted and in each step purification is facile, through simple washing out of the reagents. At the end of the sequence the desired material is released from the solid phase.

In addition compounds of General Formula I can be used as materials for solid phase extraction where a desired product is purified through selective retention on the functionalised material whilst the impurities are passed through. The desired product is then subsequently released using a different solvent system.

Further applications of compounds of General Formula I include the use as materials for chromatographic separations. Both selective separations of metal and organic compounds can be achieved through the choice of compounds of General Formula I and suitable process conditions. For example the products from Examples 74 and 75 can be used to selectively removed copper from gold in an acidic solution using a preferred affinity mechanism approach resulting in the copper being eluted first from the chromatography medium followed by the gold.

The invention will now be described in detail with reference to illustrative examples of the invention.

EXAMPLE 1

A solution of 1,2-dimercapto ethane (0.2 mol) and diallyl amine (0.1 mol) was warmed to 120° C. and heated for a total of 2 h with the addition of di-tert-butyl peroxide (0.5 mL) every 15 min. Vinyl trimethoxy silane (0.14 mol) was added and the solution heated at 120° C. for 4 h with the addition of di-tert-butyl peroxide (0.2 mL) every 30 min then cooled to 60° C. and added to a stirred mixture of silica (110 g, 60-200 μm, 60 Å) and toluene (300 mL). The mixture was stirred and refluxed for a total of 6 h. On cooling the solid was filtered, washed with methanol with centrifugation and dried to give a composition of General Formula I where Y, H and K are present and n is 2, Z is hydrogen and R in H is allyl.

EXAMPLE 2

A solution of 1,2-dimercapto ethane (0.25 mol) and diallyl amine (0.1 mol) was warmed to 120° C. and heated for a total of 1 h with the addition of di-tert-butyl peroxide (0.2 mL) every 15 min. Vinyl trimethoxy silane (0.15 mol) was added and the solution heated at 120° C. for 6 h with the addition of di-tert-butyl peroxide (0.2 mL) every 30 min then cooled to 60° C. and added to a stirred mixture of silica (120 g, 60-200 μm, 60 Å) and toluene (300 mL). The mixture was stirred and refluxed for a total of 6 h. On cooling the solid was filtered, washed well with methanol and dried to give a composition of General Formula I where Y, G, H and K are present and n is 2, Z is hydrogen and R in H is allyl.

EXAMPLE 3

A solution of 1,3-dimercapto propane (2 mol) and diallyl amine (1 mol) was warmed to 120° C. and heated for a total of 2 h with the addition of di-tert-butyl peroxide (10 mL) every 15 min. Vinyl triethoxy silane (1.4 mol) was added and the solution heated at 120° C. for 6 h with the addition of di-tert-butyl peroxide (2 mL) every 20 min then cooled to 60° C. and added to a stirred mixture of silica (1.2 kg, 60-200 μm, 100-200 Å) and toluene (3.6 L). The mixture was stirred and refluxed for 1 h and then N-3-(3-trimethoxysilylpropylsulfyl)propyl thiourea $(CH_3O)_3SiC_3H_6SC_3H_6NHC(=S)NH_2$ (0.2 mol) (formed from reacting allyl thiourea (0.2 mol) and 3-mercaptopropyl trimethoxy silane (0.2 mol) for 2 h at 125° C.) was added and the mixture stirred and refluxed for a further 5 h. On cooling the solid was filtered, washed well with methanol and dried to give a composition of General Formula I where Y, J, M and U are present and n is 2, Z is hydrogen and R in J is allyl.

EXAMPLE 4

A solution of 1,3-dimercapto propane (2.7 mol) and diallyl amine (1 mol) was warmed to 120° C. and heated for a total of 2 h with the addition of di-tert-butyl peroxide (10 mL) every 15 min. Vinyl triethoxy silane (1.6 mol) was added and the solution heated at 120° C. for 6 h with the addition of di-tert-butyl peroxide (2.0 mL) every 20 min then cooled to 60° C. and added to a stirred mixture of silica (1.2 kg, 200-500 μm, 100-200 Å) and toluene (3.6 L). The mixture was stirred and refluxed for a total of 6 h. On cooling the solid was filtered, washed well with methanol and dried to give a composition of General Formula I where Y, F, J and M are present and n is 2, Z is hydrogen and R in J is allyl.

EXAMPLE 5

A solution of 1,2-dimercapto ethane (0.6 mol) and diallyl amine (0.4 mol) was warmed to 120° C. and heated for a total of 2 h with the addition of di-tert-butyl peroxide (0.5 mL) every 15 min. Vinyl trimethoxy silane (0.8 mol) was added and the solution heated at 120° C. for 6 h with addition of di-tert-butyl peroxide (0.7 mL) every 30 min then cooled to 60° C. and added to a mixture of silica (420 g, 60-200 μm, 60 Å) and toluene (1.2 L). The mixture was stirred and refluxed for 1 h and then N-3-(3-trimethoxysilylpropylsulfyl)propyl thiourea $(CH_3O)_3SiC_3H_6SC_3H_6NHC(=S)NH_2$ (0.2 mol) (formed from reacting allyl thiourea (0.2 mol) and 3-mercaptopropyl trimethoxy silane (0.2 mol) for 2 h at 125° C.) was added and the mixture stirred and refluxed for a further 5 h. On cooling the solid was filtered, washed well with methanol using centrifugation and dried to give a composition of General Formula I where Y, H, K and U are present and n is 2, Z is hydrogen and R in H is allyl.

EXAMPLE 6

A solution of 1,2-dimercapto ethane (0.6 mol) and diallyl amine (0.4 mol) was waiiiied to 120° C. and heated for 1 h with the addition of di-tert-butyl peroxide (0.5 mL) every 15 min. Vinyl trimethoxy silane (0.6 mol) was added and the solution heated at 120° C. for 6 h with addition of di-tert-butyl peroxide (0.7 mL) every 30 min then cooled to 60° C. and added to a stirred mixture of silica (420 g, 60-200 μm, 60 Å) and toluene (1.2 L). The mixture was stirred and refluxed for a total of 6 h. On cooling the solid was filtered, washed well with methanol using centrifugation and dried to give a composition of General Formula I where Y, G, H and K are present and n is 2, Z is hydrogen and R in H is allyl.

EXAMPLE 7

A solution of 1,3-dimercapto propane (12 mol) and diallyl amine (10 mol) was warmed to 130° C. and heated for a total of 2 h with the addition of di-tert-butyl peroxide (10 mL) every 20 min. Vinyl triethoxy silane (6 mol) was added and the solution heated at 120° C. for 6 h with the addition of di-tert-butyl peroxide (10 mL) every 30 min then cooled to 60° C. and added to a stirred mixture of silica (5 kg, 60-200 μm, 100 Å) and toluene (12 L). The mixture was stirred and refluxed for a total of 6 h. On cooling the solid was filtered, washed well with methanol and dried to give a composition of General Formula I where Y, F, J and M are present and n is 2, Z is hydrogen and R in J is allyl.

EXAMPLE 8

A solution of 1,2-dimercapto ethane (0.5 mol) and diallyl amine (0.25 mol) was warmed to 120° C. and heated for a total of 4 h with the addition of di-tert-butyl peroxide (0.8 mL) every 15 min. Allyl trimethoxy silane (0.5 mol) was added and the solution heated at 120° C. for 6 h with addition of di-tert-butyl peroxide (1.5 mL) every 30 min then cooled to 60° C. and added to a stirred mixture of silica (400 g, 60-200 μm, 150 Å) and toluene (1.2 L). The mixture was stirred and refluxed for 1 h and then N-3-(3-trimethoxysilylpropylsulfyl)propyl thiourea $(CH_3O)_3SiC_3H_6SC_3H_6NHC(=S)NH_2$ (0.1 mol) (formed from reacting allyl thiourea (0.1 mol) and 3-mercaptopropyl trimethoxy silane (0.1 mol) for 2 h at 125° C.) was added and the mixture stirred and refluxed for a further 5 h. On cooling the solid was filtered, washed well with methanol and dried to give a composition of General Formula I where Y, G, H, K and U are present and n is 3, Z is hydrogen and R in H is allyl.

EXAMPLE 9

A solution of 1,3-dimercapto propane (12 mol) and diallyl amine (10 mol) was warmed to 120° C. and heated for a total of 2 h with the addition of di-tert-butyl peroxide (10 mL) every 15 min. Vinyl triethoxy silane (6 mol) was added and the solution heated at 120° C. for 3 h with the addition of di-tert-butyl peroxide (10 mL) every 20 min then cooled to 60° C. and added to a stirred mixture of silica (6.0 kg, 60-200 μm, 60 Å) and toluene (14 L). Also added was a solution of N-methyl, $N^1$ 3-(3-(2-triethoxysilyl ethyl sulfyl) propylsulfide) propyl thiourea (1.25 mol) derived from the reaction first between 1,3-dimercapto propane and N-methyl, $N^1$-allyl thiourea with a radical initiator then secondly the resultant reaction mixture was reacted with vinyl triethoxy silane at 120° C. for 4 h with a radical initiator. The combined mixture was stirred and refluxed for a total of 6 h. On cooling the solid was filtered, washed well with methanol (5×14 L) and dried to give a composition of General Formula I where Y, F, J and M are present and n is 2 and Z is C=S $NHCH_3$ in J and hydrogen in M.

EXAMPLE 10

A solution of 1,3-dimercapto propane (14 mol) and diallyl amine (10 mol) was warmed to 120° C. and heated for a total of 3 h with the addition of di-tert-butyl peroxide (10 mL) every 15 min. Vinyl triethoxy silane (6 mol) was added and the solution heated at 120° C. for 3 h with the addition of di-tert-butyl peroxide (10 mL) every 15 min then cooled to 60° C. and added to a stirred mixture of silica (6.0 kg, 60-200 μm, 60 Å) and toluene (14 L). Also added was a solution of N-methyl, $N^1$ 3-(3-(2-triethoxysilyl ethyl sulfyl) propylsulfide) propyl thiourea (1.25 mol) in toluene (100 mL). The mixture was stirred and refluxed for 1 h and then N-3-(3-trimethoxysilylpropylsulfyl)propyl thiourea $(CH_3O)_3SiC_3H_6S—C_3H_6NHC(=S)NH_2$ (0.2 mol) (formed from reacting allyl thiourea (0.2 mol) and 3-mercaptopropyl trimethoxy silane (0.2 mol) for 2 h at 125° C.) was added and the mixture stirred and refluxed for a further 5 h. On cooling the solid was filtered, washed well with methanol (5×14 L) and dried to give a composition of General Formula I where Y, F, J, M and U are present and n is 2 and Z is C=S $NHCH_3$ in J and hydrogen in M.

EXAMPLE 11

A solution of 1,2-dimercapto ethane (12 mol) and diallyl amine (8 mol) was warmed to 120° C. and heated for a total of 1 h with the addition of di-tert-butyl peroxide (10 mL) every 15 min. Vinyl trimethoxy silane (8 mol) was added and the solution heated at 120° C. for 4 h with the addition of di-tert-butyl peroxide (10 mL) every 20 min then cooled to 60° C. and added to a stirred mixture of silica (6.7 kg, 60-200 μm, 60 Å) and toluene (17 L). Also added was a solution of N-methyl, $N^1$ 3-(2-(2-trimethoxysilyl ethyl sulfyl) ethylsulfide) propyl thiourea (1 mol) derived from the reaction first between 1,3-dimercapto propane and N-methyl, $N^1$-allyl thiourea with a radical initiator then the resultant reaction mixture was reacted with vinyl trimethoxy silane at 120° C. for 4 h with a radical initiator. The combined mixture was stirred and refluxed for a total of 6 h. On cooling the solid was filtered, washed well with methanol (5×17 L) and dried to give a composition of General Formula I where Y, G, H and K are present and n is 2 and Z is C=S NHCH$_3$ in H and hydrogen in K.

EXAMPLE 12

A solution of 1,2-dimercapto ethane (12 mol) and diallyl amine (6 mol) was warmed to 120° C. and heated for a total of 2 h with the addition of di-tert-butyl peroxide (10 mL) every 15 min. Vinyl trimethoxy silane (8 mol) was added and the solution heated at 120° C. for 4 h with the addition of di-tert-butyl peroxide (10 mL) every 30 min then cooled to 60° C. and added to a stirred mixture of silica (8 kg, 200-500 μm, 100 Å) and toluene (24 L). Also added was a mixture of 3-aminopropyl trimethoxy silane (1 mol) and N-methyl, N$^1$-3-(2-(2-trimethoxysilyl ethyl sulfyl) ethylsulfide) propyl thiourea (1 mol), the latter derived from the reaction first between 1,2-dimercapto ethane and N-methyl, N$^1$-allyl thiourea with a radical initiator such as AIBN then the resultant reaction mixture was reacted with vinyl trimethoxy silane at 120° C. for 4 h with a radical initator such as di-tert-butyl peroxide. The combined mixture was stirred and refluxed for a total of 6 h. On cooling the solid was filtered, washed well with methanol (5×24 L) and dried to give a composition of General Formula I where Y, H, K and W are present and n is 2, Z is C=S NHCH$_3$ in H and hydrogen in K, R$^1$ is 3-aminopropyl, the integer z is 0 and q is 3.

EXAMPLE 13

A solution of 1,2-dimercapto ethane (12 mol) and diallyl amine (6 mol) was warmed to 120° C. and heated for a total of 2 h with the addition of di-tert-butyl peroxide (10 mL) every 15 min. Vinyl trimethoxy silane (8 mol) was added and the solution heated at 120° C. for 4 h with the addition of di-tert-butyl peroxide (10 mL) every 30 min then cooled to 60° C. and added to a stirred mixture of silica (8 kg, 200-500 μm, 100 Å) and toluene (24 L). Also added was a mixture of 3-mercaptopropyl trimethoxy silane (1 mol) and 3-(3-(2-trimethoxysilyl ethyl sulfyl) propylsulfide) propylamine (1 mol), the latter derived from the reaction first between 1,3-dimercapto propane, N-allyl amine and AIBN then the resultant reaction mixture reacted with vinyl trimethoxy silane at 120° C. for 4 h and a radical initiator. The combined mixture was stirred and refluxed for a total of 6 h. On cooling the solid was filtered, washed well with methanol (5×24 L) and dried to give a composition of General Formula I where Y, G, J, K and W are present and n is 2, Z is C=S NHCH$_3$ in J and hydrogen in K, R$^1$ is 3-mercaptopropyl, the integer z is 0 and q is 3.

EXAMPLE 14

A solution of 1,2-dimercapto ethane (0.6 mol) and N-diallyl, N$^1$-methyl thiourea (0.2 mol) was warmed to 120° C. and heated for a total of 2 h with the addition of di-tert-butyl peroxide (0.2 mL) every 20 min. Vinyl trimethoxy silane (0.75 mol) was added and the solution heated at 120° C. for 4 h with the addition of di-tert-butyl peroxide (0.2 mL) every 30 min then cooled to 60° C. and added to a stirred mixture of silica (420 g, 60-200 μm, 60 Å) and toluene (1.2 L). The mixture was stirred and refluxed for a total of 6 h. On cooling the solid was filtered, washed well with methanol and dried to give a composition of General Formula I where Y, G, H and K are present and n is 2, Z is C=S NHCH$_3$ and R in H is allyl.

EXAMPLE 15

A solution of 1,3-dimercapto propane (1 mol) and N-diallyl, N$^1$-methyl thiourea (0.2 mol) was warmed to 120° C. and heated for a total of 2 h with the addition of di-tert-butyl peroxide (1 mL) every 25 min. Vinyl trimethoxy silane (1.2 mol) was added and the solution heated at 120° C. for 4 h with the addition of di-tert-butyl peroxide (0.5 mL) every 15 min then cooled to 60° C. and added to a stirred mixture of silica (800 g, 200-500 μm, 160 Å) and toluene (2.5 L). The mixture was stirred and refluxed for a total of 6 h. On cooling the solid was filtered, washed well with methanol and dried to give a composition of General Formula I where Y, J and M are present and n is 2, Z is C=S NHCH$_3$ and R in J is allyl.

EXAMPLE 16

A solution of 1,2-dimercapto ethane (0.6 mol) and N-diallyl, N$^1$-methyl thiourea (0.4 mol) was warmed to 120° C. and heated for a total of 2 h with the addition of di-tert-butyl peroxide (0.3 mL) every 15 min. Vinyl trimethoxy silane (0.55 mol) was added and the solution heated at 120° C. for 3 h with the addition of di-tert-butyl peroxide (0.5 mL) every 30 min then cooled to 60° C. and added along with vinyl trimethoxy silane (0.2 mol) to a stirred mixture of silica (500 g, 60-200 μm, 100 Å) and toluene (1.4 L). The mixture was stirred and refluxed for a total of 6 h. On cooling the solid was filtered, washed well with methanol and dried to give a composition of General Formula I where Y, G, H, K and W are present and n is 2, Z is C=S NHCH$_3$, R is allyl in H, R$^1$ is vinyl, the integer z is 0 and q is 3.

EXAMPLE 17

A solution of 1,3-dimercapto propane (1 mol) and N-diallyl, N$^1$-methyl thiourea (0.5 mol) was warmed to 120° C. and heated for a total of 2 h with the addition of di-tert-butyl peroxide (2 mL) every 15 min. Vinyl trimethoxy silane (1.1 mol) was added and the solution heated at 120° C. for 4 h with the addition of di-tert-butyl peroxide (2 mL) every 20 min then cooled to 60° C. and added along with dimethyl dimethoxy silane (0.1 mol) to a stirred mixture of silica (800 g, 200-500 μm, 160 Å) and toluene (2.4 L). The mixture was stirred and refluxed for 6 h. On cooling the solid was filtered, washed well with methanol and dried to give a composition of General Formula I where Y, F, J, M and W are present and n is 2, Z is C=S NHCH$_3$, R is allyl in J, R and R$^1$ in W are methyl, the integer z is 1 and q is 2.

EXAMPLE 18

A solution of 1,3-dimercapto propane (1 mol) and N-diallyl, N$^1$-methyl thiourea (0.5 mol) was warmed to 120° C. and heated for a total of 4 h with the addition of di-tert-butyl peroxide (2 mL) every 15 min. Vinyl trimethoxy silane (1.1 mol) was added and the solution heated at 120° C. for 4 h with the addition of di-tert-butyl peroxide (2 mL) every 30 min then cooled to 60° C. and added to a stirred mixture of silica (750 g, 200-500 μm, 160 Å) and xylene (2.4 L). The mixture was stirred and heated at 120° C. for 1 h then trimethyl methoxy silane (0.05 mol) added and the heating continued for another 4 h. On cooling the solid was filtered, washed well with methanol and dried to give a composition of General Formula I where Y, J, M and W are present and n is 2, Z is C=S NHCH$_3$, R is allyl in J, R and R$^1$ in W are methyl, the integer z is 2 and q is 1.

EXAMPLE 19

A solution of 1,2-dimercapto ethane (12 mol) and diallyl amine (6 mol) was warmed to 120° C. and heated for 1 h with the addition of di-tert-butyl peroxide (10 mL) every 15 min. Vinyl trimethoxy silane (8 mol) was added and the solution heated at 120° C. for 4 h with the addition of di-tert-butyl peroxide (7 mL) every 30 min then cooled to 60° C. and added to a stirred mixture of silica (8 kg, 200-500 µm, 100 Å) and xylene (24 L). The mixture was stirred and heated at 120° C. for 1 h then the mixture from the reaction between 1,3-dimercapto propane (0.7 mol) and vinyl trimethoxy silane (1 mol) with a radical initiator; and 2-trimethoxysilyl ethyl sulfyl hexane (1 mol) derived fiom the radical reaction between 1-mercapto hexane and vinyl trimethoxy silane at 120° C. for 4 h with AIBN, was added. The combined mixture was stirred and heated for a total of 6 h. On cooling the solid was filtered, washed well with methanol (5×24 L) and dried to give a composition of General Formula I where Y, F, G, H, K and W are present and n is 2, Z is hydrogen, R is allyl in H, R$^1$ is hexylsulfylethyl, the integer z is 0 and q is 3.

EXAMPLE 20

A solution of 1,2-dimercapto ethane (1.2 mol), 1,3-dimercapto propane (0.6 mol) and vinyl trimethoxy silane (2.1 mol) was heated at 120° C. for 4 h with the addition of di-tert-butyl peroxide (0.8 mL) every 30 min. N-allyl, N$^i$-methyl thiourea (0.5 mol) was added and the solution heated at 120° C. for 2 h with the addition of di-tert-butyl peroxide (2.0 mL) every 20 min. The resultant solution was added to a stifled mixture of silica (1.8 kg, 200-500 µm, 100-200 Å) and toluene (5.5 L) and the combined mixture was stirred and refluxed for a total of 6 h. On cooling the solid was filtered, washed well with methanol (5×6 L) and dried to give a composition of General Formula I where Y, F, G, H and J are present and n is 2, Z is C=S NHCH$_3$ and R is allyl in H and J.

EXAMPLE 21

A solution of 1,2-dimercapto ethane (1.2 mol), 1,3-dimercapto propane (0.6 mol) and vinyl trimethoxy silane (2.1 mol) was heated at 120° C. for 5 h with the addition of di-tert-butyl peroxide (1.6 mL) every 30 min. N-allyl, thiourea (1.8 mol) was added and the solution heated at 120° C. for 2 h with the addition of di-tert-butyl peroxide (1.6 mL) every 15 min. The resultant solution was added to a stirred mixture of silica (1.8 kg, 200-500 µm, 100-200 Å) and xylene (5.6 L) then the combined mixture was stirred and heated at 120° C. for a total of 6 h. On cooling the solid was filtered, washed well with methanol (5×6 L) and dried to give a composition of General Formula I where Y, F, G, H and J are present and n is 2, Z is C=S NH$_2$ and R is allyl in H and J.

EXAMPLE 22

A solution of 1,2-dimercapto ethane (0.2 mol) and N-allyl, thiourea (0.15 mol) was warmed to 120° C. and heated for a total of 2 h with the addition of di-tert-butyl peroxide (0.3 mL) every 20 min. Vinyl trimethoxy silane (0.14 mol) was added and the solution heated at 120° C. for 5 h with the addition of di-tert-butyl peroxide (0.3 mL) every 20 min then cooled to 60° C. and added to a stirred mixture of silica (120 g, 60-200 µm, 100-200 Å) and toluene (360 mL). The mixture was stirred and refluxed for 1 h then 3-mercaptopropyl trimethoxysilane (0.04 mol) was added and the mixture stirred and refluxed for a further 4 h. On cooling the solid was filtered, washed well with methanol (4×400 mL) and dried to give a composition of General Formula I where Y, G, H and X are present, Z is C=S NH$_2$ and n is 2.

EXAMPLE 23

A solution of 1,2-dimercapto ethane (0.2 mol) and N-allyl M-methyl thiourea (0.22 mol) was warmed to 120° C. and heated for a total of 2 h with the addition of di-tert-butyl peroxide (0.6 mL) every 15 min. Vinyl trimethoxy silane (0.14 mol) was added and the solution heated at 120° C. for 5 h with the addition of di-tert-butyl peroxide (0.3 mL) every 30 min then cooled to 60° C. and added to a stirred mixture of silica (120 g, 60-200 µm, 100-200 Å) and toluene (370 mL). The mixture was stirred and refluxed for 1 h then 3-mercaptopropyl trimethoxysilane (0.04 mol) added and the mixture refluxed with stirring for a further 4 h. On cooling the solid was filtered, washed well with methanol (4×400 mL) and dried to give a composition of General Formula I where Y, H and X are present and Z is C=S NHCH$_3$ and n is 2.

EXAMPLE 24

A solution of 1,3-dimercapto propane (0.4 mol) and N-allyl, N$^1$-methyl thiourea (0.25 mol) was warmed to 120° C. and heated for a total of 2 h with the addition of di-tert-butyl peroxide (1.0 mL) every 15 min. Vinyl trimethoxy silane (0.3 mol) was added and the solution heated at 120° C. for 6 h with the addition of di-tert-butyl peroxide (0.8 mL) every 30 min then cooled to 60° C. and added to a stirred mixture of silica (220 g, 200-500 µm, 100-200 Å) and xylene (660 mL). The mixture was stirred and heated at 120° C. for a total of 5 h. On cooling the solid was filtered, washed well with methanol (4×700 mL) and dried to give a composition of General Formula I where Y, F and J are present and Z is C=S NHCH$_3$ and n is 2.

EXAMPLE 25

A solution of 1,3-dimercapto propane (0.4 mol) and N-allyl, N$^1$-methyl thiourea (0.45 mol) was warmed to 120° C. and heated for a total of 2 h with the addition of di-tert-butyl peroxide (1.0 mL) every 15 min. Vinyl trimethoxy silane (0.3 mol) was added and the solution heated at 120° C. for 6 h with the addition of di-tert-butyl peroxide (0.8 mL) every 30 min then cooled to 60° C. and added to a stirred mixture of silica (220 g, 200-500 rim, 100-200 Å) and toluene (660 mL). The mixture was stirred and refluxed for a total of 5 h. On cooling the solid was filtered, washed well with methanol (4×700 mL) and centrifugation then dried to give a composition of General Fmmula I where Y and J are present and Z is C=S NHCH$_3$ and n is 2.

EXAMPLE 26

A solution of 1,3-dimercapto propane (0.2 mol), 1,2-dimercapto ethane (0.2 mol) and N-allyl, N$^1$-methyl thiourea (0.5 mol) was warmed to 120° C. and heated for a total of 2 h with the addition of di-tert-butyl peroxide (0.5 mL) every 15 min. Vinyl trimethoxy silane (0.3 mol) was added and the solution heated at 120° C. for 6 h with the addition of di-tert-butyl peroxide (0.5 mL) every 20 min then cooled to 60° C. and added to a stirred mixture of silica (280 g, 200-500 µm, 100-200 Å) and toluene (860 mL). The mixture was stirred and refluxed for 1 h then 3-mercaptopropyl trimethoxysilane (0.04 mol) added and the mixture refluxed with stirring for a further 4 h. On cooling the solid was filtered, washed well with methanol (4×800 mL) and dried to give a composition of General Formula I where Y, X, H and J are present and Z is C=S NHCH$_3$ and n is 2.

EXAMPLE 27

A solution of 1,3-dimercapto propane (0.3 mol) and 1,5-hexadiene (0.22 mol) was warmed to 120° C. and heated for 4 h with the addition of di-tert-butyl peroxide (0.4 mL) every 15 min. Vinyl trimethoxy silane (0.2 mol) was added and the solution heated at 120° C. for 6 h with the addition of di-tert-butyl peroxide (0.6 mL) every 15 min then cooled to 60° C. and added to a stirred mixture of silica (160 g, 200-500 100-200 Å) and toluene (500 mL). The mixture was stirred and refluxed for 1 h and then N-3-(3-trimethoxysilylpropylsulfyl)propyl thiourea $(CH_3O)_3SiC_3H_6SC_3H_6NHC(=S)NH_2$ (0.2 mol) (formed from reacting allyl thiourea (0.2 mol) and 3-mercaptopropyl trimethoxy silane (0.2 mol) for 2 h at 125° C.) was added and the mixture stirred and refluxed for a further 5 h. On cooling the solid was filtered, washed well with methanol (4×600 mL) and dried to give a composition of General Formula I where Y, F, P and U are present, R in F is hydrogen and n is 2.

EXAMPLE 28

A solution of 1,3-dimercapto propane (0.3 mol) and 1,5-hexadiene (0.32 mol) was warmed to 120° C. and heated for a total of 4 h with the addition of di-tert-butyl peroxide (0.4 mL) every 20 min. Vinyl trimethoxy silane (0.15 mol) was added and the solution heated at 120° C. for 6 h with the addition of di-tert-butyl peroxide (0.4 mL) every 20 min then cooled to 60° C. and added to a stirred mixture of silica (160 g, 60-200 µm, 100-200 Å) and toluene (500 mL). The mixture was stirred and refluxed for 1 h then 3-mercaptopropyl trimethoxysilane (0.02 mol) added and the mixture refluxed with stirring for a further 4 h. On cooling the solid was filtered, washed well with (4×600 mL) and dried to give a composition of General Formula I where Y, P and X are present and n is 2.

EXAMPLE 29

A solution of 1,2-dimercaptoethane(0.2 mol) and allyl thiourea (0.15 mol) was warmed to 120° C. and heated for a total of 4 h with the addition of di-tert-butyl peroxide (0.3 mL) every 20 min. Vinyl triethoxy silane (0.14 mol) was added and the solution heated at 120° C. for 6 h with the addition of di-tert-butyl peroxide (0.2 mL) every 30 min then cooled to 60° C. and added to a stirred mixture of silica (120 g, 60-200 µm, 100-200 Å) and xylene (360 mL). The mixture was stirred and heated at 120° C. for 5 h. On cooling the solid was filtered, washed well with methanol (4×400 mL) and dried to give a composition of General Formula I where Y, G and U are present and n is 2.

EXAMPLE 30

A solution of 1,3-dimercapto propane (0.2 mol) and allyl thiourea (0.25 mol) was warmed to 120° C. and heated for a total of 4 h with the addition of di-tert-butyl peroxide (0.3 mL) every 15 min Vinyl triethoxy silane (0.14 mol) was added and the solution heated at 120° C. for 6 h with the addition of di-tert-butyl peroxide (0.2 mL) every 20 min then cooled to 60° C. and added to a stirred mixture of silica (120 g, 60-200 µm, 100-200 Å) and toluene (360 mL). The mixture was stirred and refluxed for 1 h then 3-mercaptopropyl trimethoxysilane (0.04 mol) added and the mixture refluxed with stirring for a further 4 h. On cooling the solid was filtered, washed well with methanol (4×400 mL) and dried to give a composition of General Formula I where Y, U and X are present and n is 2.

EXAMPLE 31

Under nitrogen gas sodium ethoxide (0.1 mol) was added to a solution of 1,2-dimercapto ethane (0.1 mol) in ethanol (50 mL) and after stirring for 15 min, 1-chloro, 3-thioacetyl propane(0.11 mol) was added and the mixture refluxed for 2 h. Vinyl trimethoxy silane (0.11 mol) was added and the mixture refluxed for 4 h with the addition of di-tert-butyl peroxide (0.4 mL) every 30 min. Morpholine (0.1 mol) was added and the mixture refluxed for a further 1 h. On cooling the sodium chloride was filtered off and the solution added to a stirred mixture of silica (80 g, 150-300 µm, 100 Å) and xylene (240 mL) and the combined mixture was stirred and heated at 120° C. for a total of 6 h. On cooling water (100 mL) was added and after stirring for 1 h the solid was filtered off, washed well with methanol (5×240 mL) and dried to give a composition of General Formula I where Y, A and G are present and n is 2 and R is hydrogen.

EXAMPLE 32

Under nitrogen gas sodium ethoxide (0.1 mol) was added to a solution of 1,2-dimercapto ethane (0.1 mol) in ethanol (50 mL) and after stirring for 15 min, 1-chloro, 3-thioacetyl propane (0.11 mol) was added and the mixture refluxed for 2 h. Vinyl trimethoxy silane (0.11 mol) was added and the mixture refluxed for 4 h with the addition of di-tert-butyl peroxide (0.4 mL) every 30 min. Morpholine (0.1 mol) was added and the mixture refluxed for a further 1 h. On cooling the sodium chloride was filtered off and the solution added to a stirred mixture of silica (100 g, 37-74 µm, 62 Å) and xylene (250 mL) and the combined mixture stirred and heated at 120° C. for 1 h during which methanol was removed using Dean and Stark apparatus. 3-Mercaptopropyl trimethoxysilane (0.03 mol) was added and heating and stirring was continued for another 7 h. On cooling water (100 mL) was added and after stirring for 1 h the solid was filtered, washed well with methanol (5×240 mL) and dried to give a composition of General Formula I where Y, X, A and G are present and n is 2 and R is hydrogen.

EXAMPLE 33

Under nitrogen gas sodium ethoxide (0.1 mol) was added to a solution of 1,2-dimercapto ethane (0.14 mol) in ethanol (50 mL) and after stiffing for 15 min, 1-chloro, 3-thioacetyl propane (0.11 mol) was added and the mixture refluxed for 2 h. Vinyl trimethoxy silane (0.15 mol) was added and the mixture refluxed for 4 h with the addition of di-tert-butyl peroxide (0.4 mL) every 30 min. Morpholine (0.1 mol) was added and the mixture refluxed for a further 1 h. On cooling the sodium chloride was filtered off then the solution added to a stirred mixture of silica (130 g, 37-74 µm, 63 Å) and xylene (320 mL) and the combined mixture stirred and heated at 120° C. for 1 h during which methanol was removed using Dean and Stark apparatus. 3-Mercaptopropyl trimethoxysilane (0.03 mol) was added and heating and stirring was continued for another 7 h. On cooling water (100 mL) was added and after stirring for 1 h the solid was filtered, washed well with methanol (5×400 mL) and dried to give a composition of General Formula I where Y, X, A and G are present and n is 2 and R is hydrogen.

EXAMPLE 34

Under nitrogen gas sodium ethoxide (0.1 mol) was added to a solution of 1,2-dimercapto ethane (0.14 mol) in ethanol (50 mL) and after stirring for 15 min, 1-chloro, 3-thioacetyl propane (0.11 mol) was added and the mixture refluxed for 2 h. Morpholine (0.1 mol) was added and the mixture refluxed for 1 h then vinyl trimethoxy silane (0.15 mol) was added and the mixture refluxed for 4 h with the addition of di-tert-butyl peroxide (0.4 mL) every 30 min. On cooling the sodium chloride was filtered off then the solution added to a stirred mixture of silica (140 g, 40-70 μm, 60 Å) and xylene (360 mL) and the combined mixture stirred and heated at 120° C. for 1 h during which methanol was removed using Dean and Stark apparatus. 3-Mercaptopropyl trimethoxysilane (0.04 mol) was added and heating and stirring was continued for another 8 h. On cooling, water (100 mL) was added and after stirring for 1 h the solid was filtered, washed well with methanol (5×340 mL) and dried to give a composition of General Formula I where Y, X, A and G are present and n is 2 and R is hydrogen.

EXAMPLE 35

Under nitrogen gas a solution of 3-mercaptopropyl trimethoxysilane (0.16 mol) and allyl chloride (0.32 mol) was refluxed with stirring for 2 h with the addition of AIBN (0.05 g) every 15 min. The excess allyl chloride was removed under reduced pressure and a solution of 2-mercapto 1- sodium sulfide ethane (0.16 mol) in methanol (50 mL) was added and the resultant solution refluxed for 2 h then cooled. The sodium chloride was filtered off and the solution added to a stirred mixture of silica (100 g, 40-70 μm, 60 Å) and xylene (240 mL) then the combined mixture was stirred and heated at 120° C. for 6 h during which methanol was removed using Dean and Stark apparatus. On cooling water (100 mL) was added and after stirring for 1 h the solid was filtered, washed well with methanol (5×300 mL) and dried to give a composition of General Formula I where Y and $B^1$ ($1b_2$ and $1b_3$) are present.

EXAMPLE 36

Under nitrogen gas a solution of 3-mercaptopropyl trimethoxysilane (0.16 mol) and allyl chloride (0.32 mol) was refluxed with stirring for 2 h with the addition of AIBN (0.05 g) every 15 min. Excess allyl chloride was removed and a solution of 2-mercapto 1-sodium sulfide ethane (0.10 mol) in methanol (50 mL) added and the resultant solution refluxed for 2 h. Sodium sulfide (0.06 mol) was added and the mixture refluxed for a further 1 h then cooled. The solid was filtered off and the solution added to a stirred mixture of silica (100 g, 40-70 μm, 60 Å) and xylene (250 mL) and the combined mixture stirred and heated at 120° C. for 1 h during which the methanol was removed using Dean and Stark apparatus. N-3-(3-trimethoxysilylpropylsulfyl)propylthiourea $(CH_3O)_3SiC_3H_6SC_3H_6NHC(=S)NH_2$ (0.1 mol) (formed from reacting allyl thiourea (0.1 mol) and 3-mercaptopropyl trimethoxy silane (0.1 mol) for 2 h at 125° C.) was added and the mixture heated and stirred for a further 4 h. On cooling water (100 mL) was added and after stirring for 1 h the solid was filtered, washed well with methanol (5×300 mL) and dried to give a composition of General Formula I where Y, U and $B^1$ ($1b_2$ and $1b_3$ are present.)

EXAMPLE 37

Under nitrogen gas a solution of 3-mercaptopropyl trimethoxysilane (0.16 mol) and allyl chloride (0.32 mol) was refluxed with stirring for 2 h with the addition of AIBN (0.05 g) every 15 min. The excess allyl chloride was removed under reduced pressure and a solution of 2-mercapto 1-sodium sulfide ethane (0.10 mol) in methanol (50 mL) added and the resultant solution refluxed for 2 h. Sodium sulfide (0.06 mol) was added and the mixture refluxed for a further 1 h then cooled. The sodium chloride was filtered off and the solution added to a stirred mixture of silica (110 g, 40-70 μm, 60 Å) and xylene (300 mL) and the combined mixture stirred and heated at 120° C. for 1 h during which methanol was removed using Dean and Stark apparatus. 3-Mercaptopropyl trimethoxysilane (0.04 mol) was added and heating and stirring was continued for another 5 h. On cooling water (100 mL) was added and after stirring for 1 h the solid was filtered, washed well with methanol (5×300 mL) and dried to give a composition of General Formula I where Y, X and $B^1$ ($1b_2$ and $1b_3$) are present.

EXAMPLE 38

Under nitrogen gas a solution of 3-mercaptopropyl trimethoxysilane (0.16 mol) and allyl chloride (0.32 mol) was refluxed with stirring for 2 h with the addition of AIBN (0.05 g) every 15 min. The excess allyl chloride was removed under reduced pressure and a solution of 3-mercapto 1-sodium sulfide propane (0.16 mol) in methanol (50 mL) was added and the resultant solution refluxed for 2 h then cooled. The sodium chloride was filtered off and the solution added to a stirred mixture of silica (100 g, 40-70 μm, 60 Å) and xylene (240 mL) then the combined mixture was stirred and heated at 120° C. for 6 h during which methanol was removed using Dean and Stark apparatus. On cooling water (100 mL) was added and after stirring for 1 h the solid was filtered, washed well with methanol (5×300 mL) and dried to give a composition of General Formula I where Y and $B^2$ ($2b_2$ and $2b_3$) are present.

EXAMPLE 39

Under nitrogen gas a solution of 3-mercaptopropyl trimethoxysilane (0.16 mol) and allyl chloride (0.32 mol) was refluxed with stirring for 2 h with the addition of AIBN (0.05 g) every 15 min. The excess allyl chloride was removed under reduced pressure and a solution of 3-mercapto 1-sodium sulfide propane (0.10 mol) in methanol (50 mL) was added and the resultant solution refluxed for 2 h. Sodium sulfide (0.06 mol) was added and the mixture refluxed for a further 1 h then cooled. The sodium chloride was filtered off and the solution added to a stirred mixture of silica (150 g, 40-70 μm, 60 Å) and xylene (380 mL) and the combined mixture stirred and heated at 120° C. for 1 h during which methanol was removed using Dean and Stark apparatus. 3-Mercaptopropyl trimethoxysilane (0.06 mol) along with a solution from the reaction between 1,2-dimercapto ethane (0.02 mol), 1,3-dimercapto propane (0.02 mol) and vinyl trimethoxy silane (0.05 mol) heated at 120° C. for 4 h with the addition of di-tert-butyl peroxide (0.1 mL) every 30 min, was added and heating and stirring was continued for another 7 h. On cooling water (100 mL) was added and after stirring for 1 h the solid was filtered, washed well with methanol (5×380 mL) and dried to give a composition of General Formula I where Y, X, $B^2$ ($2b_2$ and $2b_3$), F, and G are present.

EXAMPLE 40

Under nitrogen gas a solution of 3-mercaptopropyl trimethoxysilane (0.16 mol) and allyl chloride (0.32 mol) was refluxed with stirring for 2 h with the addition of AIBN (0.05 g) every 15 min. The excess allyl chloride was removed under reduced pressure and a solution of 3-mercapto 1-sodium sulfide propane (0.06 mol) in methanol (50 mL) was added and the resultant solution refluxed for 2 h then sodium sulfide (0.1 mol) added and the mixture refluxed for a further 1 h then cooled. The sodium chloride was filtered off and the solution added to a stirred mixture of silica (120 g, 150-300 µm, 100 Å) and xylene (320 mL) and the combined mixture was stirred and heated at 120° C. for 1 h during which methanol was removed using Dean and Stark apparatus. 3-Mercaptopropyl trimethoxysilane (0.05 mol) was added and heating and stirring was continued for another 5 h. On cooling water (100 mL) was added and after stirring for 1 h the solid was filtered, washed well with methanol (5×320 mL) and dried to give a composition of General Formula I where Y, X and $B^2$ ($2b_2$ and $2b_3$) are present.

EXAMPLE 41

Sodium methoxide (0.2 mol) was added to a stirred solution of 1,2-dimercapto ethane (0.2 mol) in methanol (50 mL) under an atmosphere of nitrogen. After 15 min, 1,2-dichloroethane (0.1 mol) was added and the resultant mixture refluxed for 2 h.
Vinyl trimethoxy silane (0.14 mol) was added and the mixture refluxed for a further 2 h with the addition of AIBN (0.05 g) every 15 min. The mixture was filtered and the solid washed with xylene (100 mL). The combined filtrates were added to a stirred mixture of silica (90 g, 40-70 µm, 60 Å) and xylene (180 mL) then the combined mixture stirred and heated at 120° C. for 1 h during which methanol was removed using Dean and Stark apparatus. 3-Mercaptopropyl trimethoxysilane (0.06 mol) was added and heating and stirring was continued for another 6 h. On cooling water (100 mL) was added and after 1 h stirring the solid was filtered, washed well with methanol (5×240 mL) and dried to give a composition of General Formula I where Y, X, $C^1$ ($1c_1$ and $1c_2$) and G ($g_1$ and $g_2$) are present.

EXAMPLE 42

Under nitrogen gas sodium methoxide (0.2 mol) was added to a stirred solution of 1,2-dimercapto ethane (0.2 mol) in methanol (50 mL) under an atmosphere of nitrogen. After 15 min, 1,2-dichloroethane (0.1 mol) was added and the resultant mixture refluxed for 2 h. Vinyl trimethoxy silane (0.14 mol) was added and the mixture refluxed for 2 h with the addition of AIBN (0.05 g) every 15 min. The mixture was filtered and the solid washed with xylene (100 mL). The combined filtrates were added to a stirred mixture of silica (80 g, 40-70 µm, 60 Å) and xylene (150 mL) then the combined mixture stirred and heated at 120° C. for 6 h during which methanol was removed. On cooling water (100 mL) was added and after stirring for 1 h the solid was filtered, washed well with methanol (5×240 mL) and dried to give a composition of General Formula I where Y, $C^1$ ($1c_1$ and $1c_2$) and G ($g_1$ and $g_2$) are present.

EXAMPLE 43

Sodium methoxide (0.2 mol) was added to a stirred solution of 1,2-dimercapto ethane (0.2 mol) in methanol (50 mL) under an atmosphere of nitrogen. After 15 min, 1,2-dichloroethane (0.1 mol) was added and the resultant mixture refluxed for 2 h. Vinyl trimethoxy silane (0.14 mol) was added and the mixture refluxed for a further 2 h with the addition of AIBN (0.05 g) every 15 min. The mixture was filtered and the solid washed with xylene (100 mL). The combined filtrates were added to a stirred mixture of silica (180 g, 40-70 µm, 60 Å) and xylene (420 mL) then the combined mixture stirred and heated at 120° C. for 1 h during which methanol was removed using Dean and Stark apparatus. 3-Mercaptopropyl trimethoxysilane (0.06 mol) along with a solution from the reaction between 1,2-dimercapto ethane (0.02 mol), 1,3-dimercapto propane (0.02 mol) and vinyl trimethoxy silane (0.05 mol) heated at 120° C. for 4 h with the addition of di-tert-butyl peroxide (0.1 mL) every 30 min, was added and heating and stirring continued for another 8 h. On cooling water (100 mL) was added and after stirring for 1 h the solid was filtered, washed well with methanol (5×480 mL) and dried to give a composition of General Formula I where Y, X, $C^1$ ($1c_1$ and $1c_2$), F and G ($g_1$ and $g_2$) are present.

EXAMPLE 44

Sodium methoxide (0.2 mol) was added to a stirred solution of 1,3-dimercapto propane (0.2 mol) in methanol (50 mL) under an atmosphere of nitrogen. After 15 min, 1,2-dichloroethane (0.1 mol) was added and the resultant mixture refluxed for 2 h. Vinyl trimethoxy silane (0.14 mol) was added and the mixture refluxed for a further 2 h with the addition of AIBN (0.05 g) every 15 min. The mixture was filtered and the solid washed with xylene (100 mL). The combined filtrates were added to a stirred mixture of silica (90 g, 40-70 µm, 60 Å) and xylene (160 mL) then the combined mixture stirred and heated at 120° C. for 1 h during which methanol was removed using Dean and Stark apparatus. 3-Mercaptopropyl trimethoxysilane (0.06 mol) was added and heating and stirring was continued for another 7 h. On cooling water (100 mL) was added and after stirring for 1 h the solid was filtered, washed well with methanol (5×240 mL) and dried to give a composition of General Formula I where Y, X, $C^2$ ($2c_1$ and $2c_2$) and F are present.

EXAMPLE 45

Sodium methoxide (0.2 mol) was added to a stirred solution of 1,3-dimercapto propane (0.2 mol) in methanol (50 mL) under an atmosphere of nitrogen. After 15 min, 1,2-dichloroethane (0.1 mol) was added and the resultant mixture refluxed for 2 h. Vinyl trimethoxy silane (0.14 mol) was added and the mixture refluxed for a further 4 h with the addition of AIBN (0.05 g) every 15 min. The mixture was filtered and the solid washed with xylene (100 mL). The combined filtrates were added to a stirred mixture of silica (180 g, 40-70 µm, 60 Å) and xylene (480 mL) then the combined mixture stirred and heated at 120° C. for 1 h during which methanol was removed using Dean and Stark apparatus. 3-Mercaptopropyl trimethoxysilane (0.06 mol) was added along with a solution from the reaction between 1,2-dimercapto ethane (0.02 mol), 1,3-dimercapto propane (0.02 mol) and vinyl trimethoxy silane (0.05 mol) heated at 120° C. for 4 h with the addition of di-tert-butyl peroxide (0.1 mL) every 30 min and heating and stirring was continued for another 7 h. On cooling water (100 mL) was added and after stirring for 1 h the solid was filtered, washed well with methanol (5×480 mL) and dried to give a composition of General Formula I where Y, X, $C^2$ ($2c_1$ and $2c_2$), F and G ($g_1$ and $g_2$) are present.

EXAMPLE 46

Under nitrogen gas a solution of 3-mercaptopropyl trimethoxysilane (0.16 mol) and allyl chloride (0.32 mol) was refluxed with stirring for 2 h with the addition of AIBN (0.05 g) every 15 min. The excess allyl chloride was removed under reduced pressure then a solution of 2-mercapto 1-sodium sulfide ethane (0.16 mol) in methanol (50 mL) added. The resultant solution was refluxed for 2 h then sodium methoxide (0.16 mol) added. After 15 min, 1-chloro, 3-thioacetyl propane (0.16 mol) was added and the mixture refluxed for 2 h. Morpholine (0.16 mol) was added and the mixture refluxed for 1 h then cooled. The sodium chloride was filtered off and the solution added to a stirred mixture of silica (120 g, 150-300 μm, 100 Å) and xylene (320 mL) then the combined mixture was stirred and heated at 120° C. for 1 h during which methanol was removed using Dean and Stark apparatus. 3-Mercaptopropyl trimethoxysilane (0.05 mol) was added and heating and stirring was continued for another 5 h. On cooling water (100 mL) was added and after stirring for 1 h the solid was filtered, washed well with methanol (5×360 mL) and dried to give a composition of General Formula I where Y, X and $C^3$ ($3c_1$ and $3c_2$) are present.

EXAMPLE 47

Under nitrogen gas a solution of 3-mercaptopropyl trimethoxysilane (0.16 mol) and allyl chloride (0.32 mol) was refluxed with stirring for 2 h with the addition of AIBN (0.05 g) every 15 min. The excess allyl chloride was removed under reduced pressure and a solution of 3-mercapto 1-sodium sulfide propane (0.16 mol) in methanol (50 mL) added. The resultant solution was refluxed for 2 h then sodium methoxide (0.16 mol) added. After 15 min, 1-chloro, 3-thioacetyl propane (0.16 mol) was added and the mixture refluxed for 2 h. Morpholine (0.16 mol) was added and the mixture refluxed for 1 h then cooled. The sodium chloride was filtered off and the solution added to a stirred mixture of silica (100 g, 150-300 μm, 100 Å) and xylene (240 mL) then the combined mixture was stirred and heated at 120° C. for 1 h during which methanol was removed using Dean and Stark apparatus. Heating and stirring was continued for another 5 h. On cooling water (100 mL) was added and after stirring for 1 h the solid was filtered, washed well with methanol (5×300 mL) and dried to give a composition of General Formula I where Y and $C^4$ ($4c_1$ and $4c_2$) are present.

EXAMPLE 48

Under nitrogen gas a solution of 3-mercaptopropyl trimethoxysilane (0.16 mol) and allyl chloride (0.32 mol) was refluxed with stirring for 2 h with the addition of AIBN (0.05 g) every 15 min. The excess allyl chloride was removed under reduced pressure then a solution of 3-mercapto 1-sodium sulfide propane (0.16 mol) in methanol (50 mL) was added and the resultant solution refluxed for 2 h. Sodium methoxide (0.16 mol) was added followed by 1-chloro, 3-thioacetyl propane (0.16 mol) 15 min later and the mixture refluxed for 2 h. Morpholine (0.16 mol) was added and the mixture refluxed for 1 h then cooled. The sodium chloride was filtered off and the solution added to a stirred mixture of silica (200 g, 150-300 μm, 100 Å) and xylene (540 mL) then the combined mixture was stirred and heated at 120° C. for 1 h during which methanol was removed using Dean and Stark apparatus. 3-Mercaptopropyl trimethoxysilane (0.06 mol) along with a solution from the reaction between 1,2-dimercapto ethane (0.02 mol), 1,3-dimercapto propane (0.02 mol) and vinyl trimethoxy silane (0.05 mol) heated at 120° C. for 4 h with the addition of di-tert-butyl peroxide (0.1 mL) every 30 min, was added and heating and stirring was continued for another 5 h. On cooling water (100 mL) was added and after stirring for 1 h the solid was filtered, washed well with methanol (5×500 mL) and dried to give a composition of General Formula I where Y, X, $C^4$ ($4c_1$ and $4c_2$) F and G are present.

EXAMPLE 49

Under nitrogen gas a solution of 1,2-dimercapto ethane (0.16 mol) and vinyl trimethoxy silane (0.19 mol) was heated at 120° C. for 1 h with the addition of di-tert-butyl peroxide (0.1 mL) every 15 min then cooled. Allyl chloride (0.25 mol) was added and the solution refluxed for 2 h with the addition of AIBN (0.1 g) every 15 min. The excess allyl chloride was removed under reduced pressure. A solution of sodium sulfide (0.12 mol) in methanol (80 mL) was added and the mixture refluxed for 2 h under an atmosphere of nitrogen, cooled then filtered. The solid was washed with xylene (100 mL) and the combined filtrates added to a stirred mixture of silica (130 g, 37-74 μm, 63 Å) and xylene (320 mL) then the combined mixture was stirred and heated at 120° C. for 1 h during which methanol was removed using Dean and Stark apparatus and heating and stirring was continued for another 5 h. On cooling water (100 mL) was added and after stirring for 1 h the solid was filtered, washed well with methanol (5×300 mL) and dried to give a composition of General Formula I where Y and $D^1$ ($1d_1$ and $1d_2$) are present.

EXAMPLE 50

Under nitrogen gas a solution of 1,2-dimercapto ethane (0.16 mol) and vinyl trimethoxy silane (0.19 mol) was heated at 120° C. for 1 h with the addition of di-tert-butyl peroxide (0.2 mL) every 15 min then cooled. Allyl chloride (0.25 mol) was added and the solution refluxed for 2 h with the addition of AIBN (0.05 g) every 15 min. Excess allyl chloride was removed under reduced pressure. A solution of sodium sulfide (0.12 mol) in methanol (80 mL) was added and the mixture refluxed for 2 h under an atmosphere of nitrogen, cooled then filtered. The solid was washed with xylene (100 mL) and the combined filtrates added to a stirred mixture of silica (140 g, 37-74 μm, 165 Å) and xylene (340 mL) then the mixture was stirred and heated at 120° C. for 1 h during which methanol was removed using Dean and Stark apparatus. 3-Mercaptopropyl trimethoxysilane (0.02 mol) was added and heating and stirring was continued for another 5 h. On cooling water (100 mL) was added and after stirring for 1 h the solid was filtered, washed well with methanol (5×300 mL) and dried to give a composition of General Formula I where Y, $D^1$ ($1d_1$ and $1d_2$), G ($g_1$ and $g_2$) and X are present.

EXAMPLE 51

Under nitrogen gas a solution of 1,3-dimercapto propane (0.16 mol) and vinyl trimethoxy silane (0.19 mol) was heated at 120° C. for 1 h with the addition of di-tert-butyl peroxide (0.2 mL) every 15 min then cooled. Allyl chloride (0.25 mol) was added and the solution refluxed for 2 h with the addition of AIBN (0.05 g) every 15 min then the excess allyl chloride was removed under reduced pressure. A solution of sodium sulfide (0.12 mol) in methanol (80 mL) was added and the mixture refluxed for 2 h under an atmosphere of nitrogen, cooled then filtered. The solid was washed with xylene (100 mL) and the combined filtrates added to a stiffed mixture of silica (130 g, 150-300 μm, 60 Å) and xylene (320 mL) then the combined mixture was stirred and heated at 120° C. for 1 h during which methanol was removed using Dean and Stark apparatus and heating and stirring was continued for another 5 h. On cooling water (100 mL) was added and after stirring for 1 h the solid was filtered, washed well with methanol (5×350 mL) and dried to give a composition of General Formula I where Y, $D^2$ ($2d_1$ and $2d_2$) and F are present.

EXAMPLE 52

Under nitrogen gas a solution of 1,3-dimercapto propane (0.16 mol) and vinyl trimethoxy silane (0.19 mol) was heated at 120° C. for 1 h with the addition of di-tert-butyl peroxide (0.2 mL) every 15 min then cooled. Allyl chloride (0.25 mol) was added and the solution refluxed for 2 h with the addition of AIBN (0.05 g) every 15 min then the excess allyl chloride was removed under reduced pressure. A solution of sodium sulfide (0.12 mol) in methanol (80 mL) was added and the mixture refluxed for 2 h under an atmosphere of nitrogen, cooled and then filtered. The solid was washed with xylene (100 mL) and the combined filtrates added to a stirred mixture of silica (160 g, 150-300 μm, 60 Å) and xylene (440 mL) then the combined mixture was stirred and heated at 120° C. for 1 h during which methanol was removed using Dean and Stark apparatus. 3-Mercaptopropyl trimethoxysilane (0.02 mol) was added along with a solution from the reaction between 1,2-dimercapto ethane (0.02 mol), 1,3-dimercapto propane (0.02 mol) and vinyl trimethoxy silane (0.05 mol) heated at 120° C. for 4 h with the addition of di-tert-butyl peroxide (0.1 mL) every 30 min and heating and stirring was continued for another 5 h. On cooling water (100 mL) was added and after stirring for 1 h the solid was filtered, washed well with methanol (5×360 mL) and dried to give a composition of General Formula I where Y, X, $D^2$ ($2d_1$ and $2d_2$), F and G ($g_1$ and $g_2$) are present.

EXAMPLE 53

A solution of 1,2-dimercapto ethane (0.16 mol) and vinyl trimethoxy silane (0.19 mol) was heated at 120° C. for 1 h with the addition of di-tert-butyl peroxide (0.04 mL) every 15 min then cooled. Allyl chloride (0.25 mol) was added and the solution refluxed for 2 h with the addition of AIBN (0.05 g) every 15 min then the excess allyl chloride was removed. A solution of 2-mercapto 1-sodium sulfide ethane (0.12 mol) in methanol (80 mL) was added and the mixture refluxed for 2 h under an atmosphere of nitrogen, cooled then filtered. The solid was washed with xylene (100 mL) and the combined filtrates added to a stirred mixture of silica (130 g, 150-300 μm, 100 Å) and xylene (240 mL) then the combined mixture was stirred and heated at 120° C. for 1 h during which methanol was removed using Dean and Stark apparatus and heating and stirring was continued for another 5 h. On cooling water (100 mL) was added and after stirring for 1 h the solid was filtered, washed well with methanol (5×300 mL) and dried to give a composition of General Formula I where Y, $D^3$ ($3d_1$ and $3d_2$) and G ($g_1$ and $g_2$) are present.

EXAMPLE 54

A solution of 1,2-dimercapto ethane (0.16 mol) and vinyl trimethoxy silane (0.19 mol) was heated at 120° C. for 1 h with the addition of di-tert-butyl peroxide (0.2 mL) every 15 min then cooled. Allyl chloride (0.25 mol) was added and the solution refluxed for 2 h with the addition of AIBN (0.05 g) every 15 min then the excess allyl chloride was removed under reduced pressure. A solution of 3-mercapto 1-sodium sulfide propane (0.12 mol) in methanol (80 mL) was added and the mixture refluxed for 2 h under an atmosphere of nitrogen, cooled then filtered. The solid was washed with xylene (100 mL) and the combined filtrates added to a stifled mixture of silica (130 g, 150-300 μm, 100 Å) and xylene (340 mL) then the combined mixture was stirred and heated at 120° C. for 1 h during which methanol was removed. Heating and stirring was continued for another 5 h. On cooling water (100 mL) was added and after stirring for 1 h the solid was filtered, washed well with methanol (5×320 mL) and dried to give a composition of General Formula I where Y, $D^4$ ($4d_1$ and $4d_2$) and G ($g_1$ and $g_2$) are present.

EXAMPLE 55

A solution of 1,3-dimercapto propane (0.16 mol) and vinyl trimethoxy silane (0.19 mol) was heated at 120° C. for 1 h with the addition of di-tert-butyl peroxide (0.2 mL) every 15 min then cooled. Allyl chloride (0.25 mol) was added and the solution refluxed for 2 h with the addition of AIBN (0.05 g) every 15 min then the excess allyl chloride was removed under reduced pressure. A solution of 2-mercapto 1-sodium sulfide ethane (0.12 mol) in methanol (80 mL) was added and the mixture refluxed for 2 h under an atmosphere of nitrogen, cooled then filtered. The solid was washed with xylene (100 mL) and the combined filtrates added to a stirred mixture of silica (130 g, 150-300 μm, 60 Å) and xylene (340 mL) then the combined mixture was stirred and heated at 120° C. for 1 h during which methanol was removed using Dean and Stark apparatus and heating and stirring was continued for another 5 h. On cooling water (100 mL) was added and after stirring for 1 h the solid was filtered, washed well with methanol (5×320 mL) and dried to give a composition of General Formula I where Y, $D^5$ ($5d_1$ and $5d_2$) and F are present.

EXAMPLE 56

A solution of 1,3-dimercapto propane (0.16 mol) and vinyl trimethoxy silane (0.19 mol) was heated at 120° C. for 1 h with the addition of di-tert-butyl peroxide (0.2 mL) every 15 min then cooled. Allyl chloride (0.25 mol) was added and the solution refluxed for 2 h with the addition of AIBN (0.05 g) every 15 min then the excess allyl chloride was removed under reduced pressure. A solution of 3-mercapto 1-sodium sulfide propane (0.12 mol) in methanol (80 mL) was added and the mixture refluxed for 2 h under an atmosphere of nitrogen, cooled then filtered. The solid was washed with xylene (100 mL) and the combined filtrates added to a stirred mixture of silica (140 g, 150-300 µm, 60 Å) and xylene (360 mL) then the combined mixture was stirred and heated at 120° C. for 1 h during which methanol was removed. 3-Mercaptopropyl trimethoxysilane (0.02 mol) was added and heating and stirring was continued for another 5 h. On cooling water (100 mL) was added and after 1 h stirring the solid was filtered, washed well with methanol (5×350 mL) and dried to give a composition of General Formula I where Y, F, $D^6$ ($6d_1$ and $6d2$) and X are present.

EXAMPLE 57

A solution of 3-mercaptopropyl trimethoxysilane (0.16 mol) and allyl chloride (0.32 mol) was refluxed with stirring for 2 h with the addition of AIBN (0.05 g) every 15 min. Excess allyl chloride was removed under reduced pressure and diethylene triamine (0.20 mol) added. The resultant solution was refluxed for 2 h then methanol (100 mL) added and the solution refluxed for a further 1 h. The solution was added to a stiffed mixture of silica (125 g, 150-300 µm, 60 Å) and xylene (320 mL) then the combined mixture was stirred and heated at 120° C. for 1 h during which methanol was removed using Dean and Stark apparatus. 3-Mercaptopropyl trimethoxysilane (0.05 mol) was added and heating and stifling was continued for another 5 h. On cooling water (100 mL) was added and after stirring for 1 h the solid was filtered, washed well with methanol (5×330 mL) and dried to give a composition of General Formula I where Y, X and E are present.

EXAMPLE 58

A solution of 3-mercaptopropyl trimethoxysilane (0.16 mol) and allyl chloride (0.32 mol) was refluxed with stirring for 2 h with the addition of AIBN (0.05 g) every 15 min. Excess allyl chloride was removed under reduced pressure and tetraethylene pentaamine (0.23 mol) added. The resultant solution was refluxed for 2 h then methanol (100 mL) added and the solution refluxed for a further 1 h. The solution was then added to a stirred mixture of silica (125 g, 150-300 µm, 60 Å) and xylene (320 mL) and the combined mixture stirred and heated at 120° C. for 1 h during which methanol was removed using Dean and Stark apparatus. 3-Mercaptopropyl trimethoxysilane (0.05 mol) was added and heating and stifling was continued for another 5 h. On cooling water (100 mL) was added and after stirring for 1 h the solid was filtered, washed well with methanol (5×300 mL) and dried to give a composition of General Formula I where Y, X and E are present.

EXAMPLE 59

A solution of 3-mercaptopropyl trimethoxysilane (0.16 mol) and allyl chloride (0.32 mol) was refluxed with stirring for 2 h with the addition of AIBN (0.05 g) every 15 min. Excess allyl chloride was removed under reduced pressure and piperazine (0.23 mol) added. After refluxing for 2 h reflux, methanol (100 mL) was added and the solution refluxed for a further 1 h. The solution was added to a stirred mixture of silica (125 g, 150-300 µm, 60 Å) and xylene (320 mL) and the combined mixture stirred and heated at 120° C. for 1 h during which methanol was removed using Dean and Stark apparatus. 3-Mercaptopropyl trimethoxysilane (0.05 mol) was added and heating and stirring was continued for 5 h. On cooling water (100 mL) was added and after stirring for 1 h the solid was filtered, washed well with methanol (5×300 mL) and dried to give a composition of General Formula I where Y, X and E are present.

EXAMPLE 60

A solution of 3-mercaptopropyl trimethoxysilane (0.16 mol) and allyl chloride (0.32 mol) was refluxed with stirring for 2 h with the addition of AIBN (0.05 g) every 15 min. Excess allyl chloride was removed under reduced pressure and 2-aminomethyl pyridine (0.23 mol) added. The resultant solution was refluxed for 2 h then methanol (100 mL) added and the solution refluxed for a further 1 h. The solution was then added to a stirred mixture of silica (125 g, 150-300 µm, 60 Å) and xylene (320 mL) and the combined mixture stirred and heated at 120° C. for 1 h during which methanol was removed using Dean and Stark apparatus. 3-Mercaptopropyl trimethoxysilane (0.05 mol) was added and heating and stirring was continued for another 5 h. On cooling water (100 mL) was added and after stirring for 1 h the solid was filtered, washed well with methanol (5×300 mL) and dried to give a composition of General Formula I where Y, X and E are present.

EXAMPLE 61

A solution of 3-mercaptopropyl trimethoxysilane (0.16 mol) and allyl chloride (0.32 mol) was refluxed with stirring for 2 h with the addition of AIBN (0.05 g) every 15 min. Excess allyl chloride was removed under reduced pressure and tributylamine (0.23 mol) added. The resultant solution was refluxed for 2 h then methanol (100 mL) added and the solution refluxed for a further 1 h. The solution was added to a stirred mixture of silica (125 g, 150-300 um, 60 Å) and xylene (320 mL) and the combined mixture stirred and heated at 120° C. for 1 h during which methanol was removed. 3-Mercaptopropyl trimethoxysilane (0.05 mol) was added and heating and stirring was continued for another 5 h. On cooling water (100 mL) was added and after stirring for 1 h the solid was filtered, washed well with methanol (5×300 mL) and dried to give a composition of General Formula I where Y, X and E are present.

EXAMPLE 62

A solution of 1,3-dimercapto propane (12 mol) and diallyl amine (10 mol) was warmed to 120° C. and heated for a total of 2 h with the addition of di-tert-butyl peroxide (10 mL) every 20 min. Vinyl triethoxy silane (6 mol) was added and the solution heated at 120° C. for 6 h with the addition of di-tert-butyl peroxide (10 mL) every 30 min then the solution was added to a stirred mixture of silica (8.0 kg, 60-200 µm, 60 Å) and toluene (20 L). Also added after 1 h was a solution from the reaction between 1,3-dimercapto propane (1.5 mol) and vinyl triethoxy silane (2 mol) at 120° C. for 4 h. The mixture was stirred and refluxed for 1 h and then N-3-(3-trimethoxysilylpropylsulfyl)propyl thiourea $(CH_3O)_3SiC_3H_6SC_3H_6NHC(=S)NH_2$ (0.2 mol) (formed from reacting allyl thiourea (0.2 mol) and 3-mercaptopropyl trimethoxy silane (0.2 mol) for 2 h at 125° C.) was added and the mixture stirred and refluxed for a further 5 h. On cooling the solid was filtered, washed well with methanol (5×20 L) and centrifugation and dried to give a composition of General Formula I where Y, F, J, M and U are present and Z is hydrogen and n is 2.

EXAMPLE 63

A solution of 1,2-dimercapto ethane (0.2 mol) and diallyl amine (0.1 mol) was warmed to 120° C. and heated for a total of 2 h with the addition of di-tert-butyl peroxide (0.1 mL) every 20 min. Vinyl trimethoxy silane (0.14 mol) was added and the solution heated at 120° C. for 6 h with the addition of di-tert-butyl peroxide (0.1 mL) every 25 min then cooled to room temperature. The solution was added to a stirred mixture of tetraethyl orthosilicate (125 g, 0.6 mol) dissolved in methanol (400 mL) and 1 M HCl (72 mL). The mixture was then warmed at 80° C. until the methanol had evaporated and a glass had fowled. The glass was milled then stirred in refluxing methanol and filtered. The material was dried to give a compound of General Formula I, where Y, G, H and K are present.

EXAMPLE 64

A solution of 3-mercaptopropyl trimethoxysilane (0.16 mol) and allyl chloride (0.32 mol) was refluxed with stifling for 2 h with the addition of AIBN (0.05 g) every 15 min. Excess allyl chloride was removed under reduced pressure then a solution of 3-mercapto 1-sodium sulfide propane (0.06 mol) in methanol (50 mL) added and the resultant solution refluxed for 2 h. Sodium sulfide (0.1 mol) was added and the mixture refluxed for a further 1 h then cooled. The sodium chloride was filtered off and the solution added to a stirred mixture of tetraethyl orthosilicate (1.6 mol) dissolved in methanol (1.3 L) and 1 M HCl (200 mL). The mixture was then warmed at 80° C. until the methanol had evaporated and a glass had formed. The glass was milled, stirred in first refluxing water then methanol and filtered. The material was then dried to give a compound of General Formula I where Y and $B^2$ ($2b_1$ and $2b_2$) are present.

EXAMPLE 65

Under nitrogen gas a solution of 1,3-dimercapto propane (6 mol), 1,2-dimercapto ethane (6 mol) and diallyl amine (6 mol) was warmed to 120° C. and heated for a total of 2 h with the addition of di-tert-butyl peroxide (7 mL) every 15 min. Vinyl triethoxy silane (8 mol) was added and the solution heated at 120° C. for 6 h with the addition of di-tert-butyl peroxide (7 mL) every 20 min. The solution was then added to a stirred mixture of silica (8.0 kg, 60-200 μm, 60 Å) and toluene (20 L). Also added was a filtered solution from the following reaction sequence, sodium ethoxide (0.5 mol) with 1,2-dimercapto ethane (0.5 mol) in ethanol (200 mL) and after 15 min of stirring 1-chloro, 3-thioacetyl propane (0.55 mol) was added and the mixture refluxed for 2 h; vinyl trimethoxy silane (0.55 mol) was added then the mixture refluxed for 4 h with the addition of di-tert-butyl peroxide (0.4 mL) every 30 min. Morpholine (0.5 mol) was added and the mixture refluxed for a further 1 h. The filtered solution from the reaction sequence of a solution of 3-mercaptopropyl trimethoxysilane (0.6 mol) refluxed with allyl chloride (1.2 mol) for 2 h with the addition of AIBN (0.5 g) every 15 min was then added; the excess allyl chloride was removed under reduced pressure and a solution of 2-mercapto, 1-sodium sulfide ethane (0.30 mol) in methanol (100 mL) added and the resultant solution refluxed for 2 h then sodium sulfide (0.3 mol) added and the mixture refluxed for a further 1 h then cooled. The combined mixture was stirred and refluxed for 6 h. On cooling water (21 L) was added and the mixture stirred for 1 h then the solid filtered, washed with methanol (5×20 L) and water (2×20 L). The material was dried to give a composition of General Formula I where Y, A, $B^2$ ($2b_1$ and $2b_2$), G ($g_1$ and $g_2$), H, J, K and M are present and n is 2 and Z is hydrogen.

EXAMPLE 66

A solution of 1,3-dimercapto propane (3 mol), 1,2-dimercapto ethane (8 mol) and diallyl amine (5 mol) was warmed to 120° C. and heated for a total of 2 h with the addition of di-tert butyl peroxide (2 mL) every 20 min. Vinyl triethoxy silane (8 mol) was added and the solution heated at 120° C. for 6 h with the addition of di-tert-butyl peroxide (10 mL) every 20 min. Then a filtered solution from the reaction sequence as follows, sodium ethoxide (0.5 mol) with 1,2-dimercapto ethane (0.5 mol) in ethanol (200 mL) and after 15 min of stirring 1-chloro, 3-thioacetyl propane (0.55 mol) was added and the mixture refluxed for 2 h; and 3-diethylene triamine 1-(3-trimethoxysilylpropyl sulfyl) propane (0.5 mol) was added to a stirred mixture of silica (8.0 kg, 60-200 μm, 60 Å) and toluene (20 L). Also added was a filtered solution from the following reaction sequence, 3-mercaptopropyl trimethoxysilane (0.5 mol) and allyl chloride (0.8 mol) refluxed with stirring for 2 h with the addition of AIBN (0.1 g) every 15 min; the excess allyl chloride was removed under reduced pressure and a solution of 2-mercapto 1-sodium sulfide ethane (0.40 mol) in methanol (100 mL) added and the resultant solution refluxed for 2 h then sodium sulfide (0.1 mol) was added and the mixture refluxed for a further 1 h then cooled. On cooling the reaction mixture was stirred with de-ionised water (10 L) and the solid was filtered, washed well with methanol (5×20 L) and de-ionised water (20 L) and dried to give a composition of General Formula I where Y, A, $B^2$ ($2b_1$ and $2b_2$), E, F, G ($g_1$ and $g_2$), H, J, K and M are present and Z is hydrogen and n is 2.

EXAMPLE 67

A solution of 1,3-dimercapto propane (1.2 mol) and N-methyl, $N^1$-diallyl thiourea (1 mol) was warmed to 120° C. and heated for 2 h with the addition of di-tert-butyl peroxide (0.8 mL) every 20 min. Vinyl trimethoxy silane (0.8 mol) was added and the solution heated at 120° C. for 4 h with the addition of di-tert-butyl peroxide (0.1 mL) every 20 min then cooled to 60° C. and added to a stirred mixture of silica (500 g, 300-500 μm, 100-200 Å) and toluene (1.4 L). The combined mixture was stirred and refluxed for a total of 6 h. On cooling the solid was filtered, washed well with methanol (5×2 L) and dried to give a composition of General Formula I where Y, J and M are present, n is 2 and Z is C=S NHCH$_3$.

EXAMPLE 68

A solution of 1,3-dimercapto propane (0.6 mol) and triallyl amine (0.4 mol) was warmed to 120° C. and heated for a total of 2 h with the addition of di-tert-butyl peroxide (0.5 mL) every 15 min. Vinyl trimethoxy silane (0.5 mol) was added and the solution heated at 120° C. for 4 h with the addition of di-tert-butyl peroxide (0.2 mL) every 20 min then cooled to 60° C. and added to a stirred mixture of silica (400 g, 200-500 μm, 100-200 Å) and toluene (1.2 L). The mixture was stirred and refluxed for 1 h and then N-3-(3-trimethoxysilylpropylsulfyl)propyl thiourea $(CH_3O)_3SiC_3H_6SC_3H_6NHC(=S)NH_2$ (0.2 mol) (formed from reacting allyl thiourea (0.2 mol) and 3-mercaptopropyl trimethoxy silane (0.2 mol) for 2 h at 125° C.) was added and the mixture stirred and refluxed for a further 5 h. On cooling the solid was filtered, washed well with methanol (5×1.5 L) and dried to give a composition of General Formula I where Y, J, M and U are present, n is 2 and Z and R are allyl.

EXAMPLE 69

A solution of 3-mercaptopropyl trimethoxysilane (0.16 mol) and allyl chloride (0.32 mol) was refluxed with stirring for 2 h with the addition of AIBN (0.05 g) every 15 min. The excess allyl chloride was removed under reduced pressure and the solution added to a stirred mixture of silica (100 g, 150-300 μm, 100 Å) and xylene (280 mL) then the combined mixture was stirred and heated at 120° C. for 6 h. On cooling the solid was filtered, washed well with methanol (2×300 mL) and dried to give a composition of General Formula I where Y and E are present.

EXAMPLE 70

A solution of 3-mercaptopropyl trimethoxy silane (0.24 mol) and N-diallyl, $N^1$-methyl thiourea (0.12 mol) was warmed to 120° C. and heated for a total of 2 h with the addition of di-teat-butyl peroxide (0.3 mL) every 15 min then added to a stirred mixture of silica (100 g, 60-200 μm, 100 Å) and toluene (260 mL). The mixture was stirred and refluxed for a total of 6 h. On cooling the solid was filtered, washed well with methanol and dried to give a composition of General Formula I where Y, X and M are present and Z is methyl.

EXAMPLE 71

A mixture of 3-mercaptopropyl silica (20 g, 60-200 μm, 100 Å, 1.2 mmol/g), diallyl dimethyl ammonium chloride (0.12 mol, 60% in water) and de-ionised water (60 mL) was heated at 110° C. for 20 h with the addition of tert-butyl hydrogen peroxide (0.1 mL) every 15 min. On cooling to 50° C. de-ionised water was added and the solution stirred for 10 min then filtered. The solid was stirred and filtered in de-ionised water (5×100 mL) then in methanol (100 mL) and dried to give to give a composition of General Formula I where Y, X and V are present and n is 3, n2 is zero; $R^9$ is a mixture of $(CH_2)N^+(Cl^-)(CH_3)_2CH_2CH_2CH_3$, $(CH_2)_3N^+(Cl^-)(CH_3)_2CH_2CH_2CHCH_2$ where $L^1$ is chloride and a compound of General Formula III; n3 is an integer between 1 and 100.

EXAMPLE 72

A solution of 3-mercaptopropyl trimethoxysilane (0.04 mol), diallyl dimethyl ammonium chloride (0.072 mol, 60% in water) and ethanol (30 mL) was was refluxed for 2 h with the addition of tert-butyl hydrogen peroxide (0.1 mL) every 15 min. The solution was then added to a stirred mixture of silica (20 g, 40-60 μm, 60 Å) and ethanol (30 mL) then refluxed for 6 h. On cooling the solid was filtered, washed well with de-ionised water (5×100 mL) followed by methanol (100 mL) and dried to give a composition of General Formula I where Y, X and V are present and n is 2, n1 is 2; n2 is one; $R^9$ is a mixture of $(CH_2)_3N^+(Cl^-)(CH_3)_2CH_2CH_2CH_3$, $(CH_2)_3N^+(Cl^-)(CH_3)_2CH_2CHCH_2$ $L^1$ is chloride; and a compound of General Formula III; n3 is an integer between 1 and 20.

EXAMPLE 73

A solution of 1,2-dimercapto ethane (0.10 mol) and vinyl trimethoxy silane (0.12 mol) was heated at 110° C. for 1 h with the addition of di-tert-butyl peroxide (0.3 mL) every 30 min. Diallyl dimethyl ammonium chloride (0.24 mol, 60% in water) and ethanol (60 mL) were added and the resultant solution heated for 2 h with the addition of tert-butyl hydrogen peroxide (0.05 mL) every 15 min. The solution was then added to a stirred mixture silica (100 g, 150-300 μp.m, 100 Å) and ethanol (200 mL) and refluxed for 6 h. On cooling the solid was filtered, washed well with de-ionised water (5×300 mL) followed by methanol (300 mL) and dried to give a composition of General Formula I where Y, G and V are present and n is 3, n2 is zero; $L^1$ is chloride; n3 is an integer between 1 and 50, $R^9$ is a mixture of a compound of General Formula III and $(CH_2)_3N^+(Cl^-)(CH_3)_2CH_2CH_2CH_3$, $(CH_2)_3N^+(Cl^-)(CH_3)_2CH_2CHCH_2$.

EXAMPLE 74

A solution of 3-mercaptopropyl trimethoxysilane (0.16 mol) and allyl chloride (0.32 mol) was refluxed with stirring for 2 h with the addition of AIBN (0.05 g) every 15 min. The excess allyl chloride was removed under reduced pressure then diethylene triamine (0.20 mol) added. After heating at 100° C. for 2 h methanol (100 mL) was added and the solution refluxed for a further 1 h. The solution was added to a stirred mixture of silica (100 g, 150-300 μm, 60 Å) and xylene (250 mL) then the combined mixture was stirred and heated at 120° C. for 1 h during which methanol was removed using Dean and Stark apparatus. Heating and stirring was continued for another 5 h. On cooling water (100 mL) was added and after stirring for 1 h the solid was filtered, washed well with methanol (5×300 mL) and dried to give a composition of General Formula I where Y and E are present.

EXAMPLE 75

A solution of 3-mercaptopropyl trimethoxysilane (0.16 mol) and allyl chloride (0.32 mol) was refluxed with stirring for 2 h with the addition of AIBN (0.05 g) every 15 min. The excess allyl chloride was removed under reduced pressure then tetraethylene pentaamine (0.23 mol) added. After a 2 h reflux methanol (100 mL) was added and the solution refluxed for a further 1 h. The solution was added to a stirred mixture of silica (100 g, 150-300 μm, 60 Å) and xylene (240 mL) then the combined mixture was stirred and heated at 120° C. for 1 h during which methanol was removed using Dean and Stark apparatus. The mixture was stirred and refluxed for 1 h and then N-3-(3-trimethoxysilylpropylsulfyl)propyl thiourea $(CH_3O)_3SiC_3H_6SC_3H_6NHC(=S)NH_2$ (0.05 mol) (formed from reacting allyl thiourea (0.05 mol) and 3-mercaptopropyl trimethoxy silane (0.05 mol) for 2 h at 125° C.) was added and the mixture stirred and refluxed for a further 5 h. On cooling water (100 mL) was added and after stirring for 1 h the solid was filtered, washed well with methanol (5×300 mL) and dried to give a composition of General Formula I where Y, E and U are present.

EXAMPLE 76

The product from Example 16 (0.05 g) was added to a sample (6 mL) of a product stream containing 205 ppm of iridium originating from the use of iridium trichloride. The mixture was filtered after agitating for 1 h at 30° C. Analysis of the filtrate showed the iridium had been removed. Examples 5-12, 19, 32-38, 40-48, 57-59 and 64-68 were equally effective in this test.

EXAMPLE 77

The product from Example 67 (0.03 g) was added to a sample (10 mL) of a product stream containing 55 ppm of iridium originating from the use of the catalyst chlorocarbonylbis(triphenylphosphine) iridium(I). The mixture was filtered after agitating for 6 h at 60° C. Analysis of the filtrate showed the iridium had been removed. Examples 14-18, 20-26 and 31-46 were equally effective in this test.

EXAMPLE 78

The product from Example 35 (0.03 g) was added to a sample (3 mL) of a process stream containing 150 ppm of rhodium originating from the use of the catalyst chlorotris (triphenylphosphine) rhodium(I) (Wilkinson's catalyst). The mixture was filtered after agitating for 1 h at room temperature. Analysis of the filtrate showed the rhodium had been removed. Examples 9-13, 16-18, 33-56, and 64-70 were equally effective in this test.

EXAMPLE 79

The product from Example 40 (0.03 g) was added to a sample (3 mL) of a process stream containing 150 ppm of rhodium originating from the use of the catalyst acetylacetonatodicarbonyl rhodium(I). The mixture was filtered after agitating for 1 h at room temperature. Analysis of the filtrate showed the rhodium had been removed. Examples 14-18, 35-38, 40-51 and 64-68 were equally effective in this test.

EXAMPLE 80

The product from Example 3 (0.01 g) was added to a sample (3 mL) of a product stream containing 60 ppm of palladium originating from the use of palladium acetate as the catalyst. The mixture was filtered after agitating for 30 min at 30° C. Analysis of the filtrate showed the palladium had been completely removed. Examples 1, 4-26, 39-41, 49-61 and 64-66 were equally effective in this test.

EXAMPLE 81

The product from Example 16 (0.03 g) was added to a sample (3 mL) of a product stream containing 120 ppm of palladium originating from the use of the catalyst tetrakis (triphenylphosphine) palladium(0). The mixture was filtered after agitating for 2 h at 30° C. Analysis of the filtrate showed the palladium had been removed. Examples 14-15, 20-26, 31-37, 39-47 and 64-70 were equally effective in this test.

EXAMPLE 82

The product from Example 15 (0.03 g) was added to a sample (2 mL) of a product stream containing 200 ppm of palladium originating from the use of the catalyst tris (dibenzylideneacetone) dipalladium(0). The mixture was filtered after agitating for 1 h at 30° C. Analysis of the filtrate showed the palladium had been removed. Examples 16-18, 20-26, 35-40, 43-46 and 65-69 were equally effective in this test.

EXAMPLE 83

The product from Example 23 (0.04 g) was added to a sample (15 mL) of a process stream containing 50 ppm of platinum originating from the use of the catalyst chloroplatinic acid. The mixture was filtered after agitating for 6 h at 30° C. Analysis of the filtrate showed the platinum had been removed. Examples 1-3, 9-13, 20-26, 32-38, 48, 52, 57-59, 65-67 and 71-75 were equally effective in this test.

EXAMPLE 84

The product from Example 38 (0.04 g) was added to a sample (20 mL) of a product stream containing 5 ppm of platinum originating from the use of the catalyst chloroplatinic acid. The mixture was filtered after agitating for 6 h at 50° C. Analysis of the filtrate showed the platinum had been removed. Examples 1-3, 9-13, 20-26, 32-37, 48, 52, 57-59, 65-67 and 71-75 were equally effective in this test.

EXAMPLE 85

A silane waste process stream (20 L) containing 40 ppm of platinum was passed down, at 50° C., a column containing the product (100 g) from Example 38. Analysis of the treated stream showed the residual platinum content was less than 1 ppm. Examples 23 and 66 were equally effective in this test.

EXAMPLE 86

A hydroformylation waste process stream (5 L) containing 300 ppm of rhodium was passed down, at 80° C., a column containing the product (100 g) from Example 14. Analysis of the treated stream showed the residual rhodium content was less than 1 ppm. Examples 35 and 42 were equally effective in this test.

EXAMPLE 87

The product from Example 15 (0.04 g) was added to a sample (4 mL) of a process stream containing 50 ppm of ruthenium originating from the use of a Grubbs' catalyst, bis(tricyclohexylphosphine) benzyledine ruthenium(IV) dichloride. The mixture was filtered after agitating for 6 h at 30° C. Analysis of the filtrate showed the ruthenium had been removed. Examples 23, 34 and 65 were equally effective in this test.

EXAMPLE 88

The product from Example 14 (0.01 g) was added to a sample (5 mL) of a product stream containing 5 ppm of ruthenium originating from the use of the Grubbs' catalyst above in Example 87. The mixture was filtered after agitating for 6 h at 60° C. Analysis of the filtrate showed all ruthenium had been removed. Examples 21-26, 33-35, 39, 43-45, 57, 65 and 66 were equally effective in this test.

EXAMPLE 89

30 L of a solution containing 10,000 ppm of combined zinc and iron, 4 ppm each of platinum and palladium, 3 ppm of ruthenium and 1.5 ppm of rhodium was passed through a fixed bed of the product from Example 37 (100 g) at a flow rate of 0.3 L/h. The reduction in metal content of the treated solution was platinum 99%; palladium 99%, ruthenium 60% and rhodium 70%.

EXAMPLE 90

The product from Example 57 (0.2 g) was added to a sample from a process stream (40 mL) containing 60 ppm of copper originating from the use of a copper(I) catalyst. The mixture was agitated gently at room temperature for 2 h then filtered. Analysis of the filtrate showed the copper had been removed. Examples 1-8, 20-26, 31-39 and 58-61 were also effective in this test.

EXAMPLE 91

A process stream containing 2-chloro-N,N'-diethylacetamide (19 mg) was treated with the product from Example 21 (2 molar equivalents) by heating with stirring for 15 h at 50° C. The solid was filtered and analysis of the stream indicated the complete removal of 2-chloro-N,N'-diethylacetamide.

EXAMPLE 92

A solution of palladium acetate (0.48 g) in dichloromethane (30 mL) was added to the product from Example 35 (2.0 g) and the mixture left to agitate overnight at 20° C. The yellow solid was filtered, washed well with dichloromethane then dried.

EXAMPLE 93

A mixture of the palladium catalyst formed in Example 92 (50 mg), 4-bromotoluene (1.6 mmol), phenyl boronic acid (1.6 mmol) and potassium carbonate (2.4 mmol) in xylene (10 mL) was stirred at 110° C. for 1 h. The mixture was filtered and the solid washed well with ether. The combined organic extracts were washed with water, dried then concentrated to give 4-methyl biphenyl in 99% yield.

EXAMPLE 94

A solution of 2'-chloroacetophenone (100 mg) in anhydrous ether (5 mL) was treated with the product from Example 21 (2 molar equivalents) by heating the mixture at 30° C. with stirring for 1.5 h. The mixture was filtered and the organic solvent concentrated and analysis of the residue indicated less than 1% residual alkyl chloride.

EXAMPLE 95

A solution of 2-chloromethyl pyridine (100 mg) in anhydrous toluene (10 mL) was treated with the product from Example 17 (2 molar equivalents) by heating at 60° C. with stirring for 2 h. The mixture was filtered then the organic solvent concentrated and the residue analysis indicating less than 1% residual alkyl chloride.

EXAMPLE 96

The product from Example 57 (0.03 g) was added to a sample (3 mL) of a waste stream containing 25 ppm of felTous and ferric ions. The mixture was filtered after agitating for 6 h at 30° C. Analysis of the filtrate showed the iron had been removed. Examples 1-13 and 58-60 were equally effective in this test.

The invention claimed is:
1. Compositions of General Formula I:

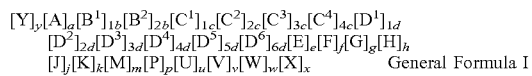

General Formula I wherein:
Y is $Si(O_{4/2})$;
W is $R_ZR^1Si(O_{q/2})$;
X is $(O_{3/2})SiC_3H_6SH$;

A is $[(O_{3/2})Si(CH_2)_2SCH_2CH_2S-CH_2CH_2CH_2SR]_{a1}$ $[(O_{3/2})Si(CH_2)_2SCH_2CH_2SCH_2CH_2CH_2S(CH_2)_2Si(O_{3/2})]_{a2}$ $[(O_{3/2})Si(CH_2)_2SCH_2CH_2-CH_2SCH_2CH_2SR]_{a3}$;

$B^1$ is $[(O_{3/2})Si(CH_2)_3SCH_2CH_2CH_2SH]_{b1}$ $[(O_{3/2})Si(CH_2)_3SCH_2CH_2CH_2SCH_2CH_2-SH]_{b2}$ $[(O_{3/2})Si(CH_2)_3SCH_2CH_2CH_2SCH_2CH_2SCH_2CH_2CH_2S(CH_2)_3Si(O_{3/2})]_{b3}$;

$B^2$ is $[(O_{3/2})Si(CH_2)_3-SCH_2CH_2CH_2SH]_{b1}$ $[(O_{3/2})Si(CH_2)_3SCH_2CH_2CH_2SCH_2CH_2CH_2SH]_{b2}$ $[(O_{3/2})Si(CH_2)_3SCH_2CH_2CH_2S-CH_2CH_2CH_2SCH_2CH_2CH_2S(CH_2)_3Si(O_{3/2})]_{b3}$;

$C^1$ is $[(O_{3/2})Si(CH_2)_2SCH_2CH_2SCH_2CH_2SCH_2CH_2SH]_{c1}$ $[(O_{3/2})Si(CH_2)_2SCH_2CH_2SCH_2CH_2SCH_2CH_2S(CH_2)_2Si(O_{3/2})]_{c2}$;

$C^2$ is $[(O_{3/2})Si(CH_2)_2SCH_2CH_2CH_2S-CH_2CH_2SCH_2CH_2CH_2SH]_{c1}$ $[(O_{3/2})Si(CH_2)_2SCH_2CH_2CH_2SCH_2CH_2SCH_2CH_2CH_2S(CH_2)_2Si(O_{3/2})]_{c2}$;

$C^3$ is $[(O_{3/2})Si(CH_2)_3SCH_2CH_2CH_2SCH_2CH_2SCH_2CH_2SR]_{c1}$ $[(O_{3/2})Si(CH_2)_3SCH_2CH_2CH_2SCH_2CH_2S-CH_2CH_2CH_2S(CH_2)_3Si(O_{3/2})]_{c2}$;

$C^4$ is $[(O_{3/2})Si(CH_2)_3SCH_2CH_2CH_2SCH_2CH_2CH_2SCH_2CH_2CH_2SR]_{c1}$ $[(O_{3/2})Si(CH_2)_3SCH_2CH_2CH_2SCH_2CH_2CH_2SCH_2CH_2CH_2S(CH_2)_3Si(O_{3/2})]_{c2}$;

$D^1$ is $[(O_{3/2})Si(CH_2)_2S-CH_2CH_2SCH_2CH_2CH_2SH]_{d1}$ $[(O_{3/2})Si(CH_2)_2SCH_2CH_2S(CH_2)_2Si(O_{3/2})]_{d2}$;

$D^2$ is $[(O_{3/2})Si(CH_2)_2SCH_2-CH_2CH_2SCH_2CH_2CH_2SH]_{d1}$ $[(O_{3/2})Si(CH_2)_2SCH_2CH_2CH_2S(CH_2)_2Si(O_{3/2})]_{d2}$;

$D^3$ is $[(O_{3/2})Si(CH_2)_2S-CH_2CH_2SCH_2CH_2CH_2SCH_2CH_2SH]_{d1}$ $[(O_{3/2})Si(CH_2)_2SCH_2CH_2S(CH_2)_2Si(O_{3/2})]_{d2}$;

$D^4$ is $[(O_{3/2})Si(CH_2)_2SCH_2CH_2SCH_2CH_2SCH_2CH_2CH_2SH]_{d1}$ $[(O_{3/2})Si(CH_2)_2SCH_2CH_2S(CH_2)_2Si(O_{3/2})]_{d2}$;

$D^5$ is $[(O_{3/2})Si(CH_2)_2SCH_2CH_2CH_2SCH_2CH_2CH_2SCH_2CH_2SH]_{d1}$ $[(O_{3/2})Si(CH_2)_2SCH_2CH_2CH_2S(CH_2)_2-Si(O_{3/2})]_{d2}$;

$D^6$ is $[(O_{3/2})Si(CH_2)_2SCH_2CH_2CH_2SCH_2CH_2SCH_2CH_2CH_2SH]_{d1}$ $[(O_{3/2})Si(CH_2)_2S-CH_2CH_2CH_2S(CH_2)_2Si(O_{3/2})]_{d2}$;

E is $[(O_{3/2})Si(CH_2)_3SCH_2CH_2CH_2NR^3R^4]$;

F is $[(O_{3/2})Si(CH_2)_nSCH_2-CH_2CH_2SR]_{f1}[(O_{3/2})Si(CH_2)_nSCH_2CH_2CH_2S(CH_2)_nSi(O_{3/2})]_{f2}$;

G is $[(O_{3/2})Si(CH_2)_nSCH_2CH_2SR]_{g1}$ $[(O_{3/2})Si(CH_2)_nSCH_2CH_2S(CH_2)_nSi(O_{3/2})]_{g2}$;

H is $[(O_{3/2})Si(CH_2)_nSCH_2CH_2S(CH_2)_3NZR]$;

J is $[(O_{3/2})Si(CH_2)_nSCH_2CH_2CH_2S(CH_2)_3NZR]$;

K is $[(O_{3/2})Si(CH_2)_nSCH_2CH_2S((CH_2)_3NZ(CH_2)_3SCH_2CH_2S)_xR]_{k1}$ $[(O_{3/2})Si(CH_2)_nSCH_2CH_2S((CH_2)_3NZ(CH_2)_3SCH_2CH_2S)_y(CH_2)_nSi(O_{3/2})]_{k2}$ $[(O_{3/2})Si(CH_2)_nSCH_2CH_2S-((CH_2)_3NZ(CH_2)_3SCH_2CH_2S)_i(CH_2)_3NZR]_{k3}$;

M is $[(O_{3/2})Si(CH_2)_nSCH_2CH_2CH_2S((CH_2)_3NZ(CH_2)_3S-CH_2CH_2CH_2S)_xR]_{m1}[(O_{3/2})Si(CH_2)_nSCH_2CH_2CH_2S((CH_2)_3NZ(CH_2)_3SCH_2CH_2CH_2S)_y(CH_2)_nSi(O_{3/2})]_{m2}$ $[(O_{3/2})Si(CH_2)_nSCH_2CH_2CH_2S((CH_2)_3NZ(CH_2)_3SCH_2CH_2CH_2S)_i(CH_2)_3NZR]_{m3}$;

P is $[(O_{3/2})Si(CH_2)_nS-CH_2CH_2CH_2S((CH_2)_2T(CH_2)_2SCH_2CH_2CH_2S)_xR]_{p1}$ $[(O_{3/2})Si(CH_2)_nSCH_2CH_2CH_2S((CH_2)_2T(CH_2)_2S-CH_2$ $CH_2CH_2S)_v(CH_2)_nSi(O_{3/2})]_{p2}$ $[(O_{3/2})Si(CH_2)_nSCH_2CH_2CH_2S((CH_2)_2T(CH_2)_2SCH_2CH_2CH_2S)_i(CH_2)_2\text{-}TR]_{p3}$;

U is $[(O_{3/2})Si(CH_2)_3S(CH_2)_3NHC(=S)NH_2]$;

V is $[O_{3/2}Si(CH_2)_nS[(CH_2)_{n1}S]_{n2}R^9$ wherein:
in the above Z is $CONHR^5$;
$R_Z$ is $C_{1-22}$-aryl group;
T is an optionally substituted $C_{2-22}$-cycloalkyl group, $C_{2-22}$-aryl group, $C_{2-22}$-heteroaryl group and a $C_{2-22}$-alkylaryl group;
R is selected from a hydrogen, $C_{1-22}$-alkyl group, $C_{2-22}$-alkenyl group, $C_{1-22}$-aryl group, $C_{1-22}$-alkylaryl group and an acyl group $CO\ R_2$;
$R^1$ is alkyl polyalkyl amine group;
$R^2$ is independently selected from a hydrogen, $C_{1-22}$-alkyl group, $C_{2-22}$-alkenyl group and a $C_{1-22}$-aryl group;
$R^5$ is hydrogen;
$R^3$ and $R^4$ are either independently selected from a hydrogen, $C_{1-22}$-alkyl group, $C_{1-22}$-aryl group, $C_{1-22}$-heteroaryl group, $C_{1-22}$-alkylaryl group, alkyl amine group, alkyl polyalkyl amine group, a trialkyl ammonium group or both part of a $C_{3-12}$-cyclic alkyl or hetero alkyl or aromatic group;
$R^9$ is a mixture of $(CH_2)_3N^+(L^1)(CH_3)_2CH_2CH_2CH_3$, $(CH_2)_3N^+(L^1)(CH_3)_2CH_2CHCH_2$ and a compound of General Formula III;
n3 is an integer between 1 and 100;
$L_1$ is an anion including but not limited to a halide, nitrate, sulfate, carbonate, phosphate, chromate, permanganate, borohydride, cyanoborohydride;

General Formula III

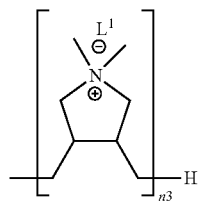

wherein:
n and n1 are integers independently either 2 or 3;
n2 is an integer between 0 and 100;
i, x and v are independent integers from 1 to 100;
q is an integer from 1 to 3,
z is an integer from 0 to 2
such that q+z=3;
a, a1, a2, a3, 1b, 1b1, 1b2, 1b3, 2b, 2b1, 2b2, 2b3, 1c, 1c1, 1c2, 2c, 2c1, 2c2, 3c, 3c1, 3c2, 4c, 4c1, 4c2, 1d, 1d1, 1d2, 2d, 2d1, 2d2, 3d, 3d1, 3d2, 4d, 4d1, 4d2, 5d, 5d1, 5d2, 6d, 6d1, 6d2, e, f, f1, f2, g, g1, g2, h, j, k, k1, k2, k3, m, m1, m2, m3, p, p1, p2, p3, u, u1, u2, u3, v, x, w and y are integers such that the ratio of:
y:a+(1 to 2)b+(1 to 4)c+(1 to 6)d+e+f+g+h+j+k+m+v+w+x is from 0.01 to 10,000;
y:a+(1 and 2)b+(1 to 4)c+(1 to 6)d+e+f+g+v+w+x is from 0.01 to 10,000;
y:f+g+h+j+k+m+v+w+x is from 0.01 to 10,000;
y:e+f+g+w+x is from 0.01 to 10,000;
y:f+g+h+j+p+u+v+w+x is from 0.01 to 10,000; and
respectively each of the following ratios a1:a3; a1:a2+a3; 1b2:1b1+1b3; 2b2:2b1+2b3; 1c1:1c2; 2c1:2c2; 3c1:3c2; 4c1:4c2; 1d1:1d2; 2d1:2d2; 3d1:3d2; 4d1:4d2; 5d1:5d2; 6d1:6d2; f1:f2; g1:g2; k1:k3; k1:k2+k3; m1:m3; m1:m2+m3; p1:p3; p1:p2+p3 vary independently between 0.01 to 100; and wherein:
in General Formula I, component Y and at least one of the following components K, M and P are present, and the composition optionally comprises at least one of the following components A, $B^{1-2}$, $C_{1-4}$, $D_{1-6}$, E, F, G, H, J, U, W and X.

2. A composition as claimed in claim 1 wherein either components Y, U, H and K or Y, U, J and M are present.

3. A process for treating a feed material comprising, contacting a compound as claimed in claim 1 with a feed material:
i.) to remove a component or components of the feed material so as to produce a material depleted in the removed component;
ii.) to effect a chemical reaction by catalytic transformation of a component of the feed material to produce a desired product; or
iii.) to remove an ionic species in the feed material in an ion exchange process.

4. Use of a compound as claimed in claim 1 as a functionalised material for the removal of or reducing the level of an unwanted organic, inorganic or biological compound from a liquid feed material.

5. Use of a compound as claimed in claim 1 as a functionalised material for the removal of or reducing the level of precious metals such as platinum, palladium, rhodium, iridium, gold, ruthenium, rhenium or rare earth metals and nickel from reaction mixtures, process, product and waste streams or waste waters or bound or attached to other organic compounds.

6. Use of a compound as claimed in claim 1 for the separation or purification of organic, biological or inorganic molecules from gaseous, liquid and solid environments.

* * * * *